(12) United States Patent
Nemoto et al.

(10) Patent No.: US 9,189,168 B2
(45) Date of Patent: *Nov. 17, 2015

(54) DATA MIGRATION SYSTEM AND DATA MIGRATION METHOD

(71) Applicant: Hitachi, Ltd, Tokyo (JP)

(72) Inventors: Jun Nemoto, Yokohama (JP); Atsushi Sutoh, Yokohama (JP); Hitoshi Kamei, Sagamihara (JP); Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 135 days.

This patent is subject to a terminal disclaimer.

(21) Appl. No.: 13/658,389

(22) Filed: Oct. 23, 2012

(65) Prior Publication Data
US 2013/0046802 A1     Feb. 21, 2013

Related U.S. Application Data

(63) Continuation of application No. 12/490,047, filed on Jun. 23, 2009, now Pat. No. 8,316,065.

(30) Foreign Application Priority Data

Apr. 23, 2009   (JP) .................. 2009-104644

(51) Int. Cl.
  *G06F 3/06*     (2006.01)
  *G06F 17/30*    (2006.01)
(52) U.S. Cl.
  CPC ............ *G06F 3/0647* (2013.01); *G06F 3/0605* (2013.01); *G06F 3/067* (2013.01); *G06F 17/30079* (2013.01); *G06F 17/30221* (2013.01)

(58) Field of Classification Search
  CPC ..... G06F 3/0647; G06F 3/0605; G06F 3/067; G06F 17/30221; G06F 17/30079
  USPC ......................................................... 707/827
  See application file for complete search history.

(56) References Cited

U.S. PATENT DOCUMENTS 4,507,752 A *  3/1985  McKenna et al. ..................... 1/1
4,887,204 A    12/1989  Johnson et al.
5,537,585 A    7/1996  Blickenstaff et al.

(Continued)

FOREIGN PATENT DOCUMENTS

JP        2008-015984      1/2008

OTHER PUBLICATIONS

Adamson, et al.; Extending NFSv4 for Petascale Data Management; May 1, 2006; CITI Technical Report 06-05; 7 pages.

*Primary Examiner* — Brannon W Smith
(74) *Attorney, Agent, or Firm* — Foley & Lardner LLP

(57) ABSTRACT

When performing migration of data from a migration source file server which is not endowed with any HSM interface, to a migration destination file server which is endowed with HSM, a volume of high capacity is needed for the migration destination file server, and moreover the performance deteriorates directly after the migration. However, with this system, the manager is enabled to set a migration policy using attribute information which can be acquired through a standard file access interface possessed by a file server program, and, when setting the attribute information of the migration destination file, the tier of the file which is to be created is determined, and the migration destination file is created, on the basis of this attribute information and migration policy.

12 Claims, 26 Drawing Sheets

(56) References Cited

U.S. PATENT DOCUMENTS

| | | | |
|---|---|---|---|
| 5,644,766 A | 7/1997 | Coy et al. | |
| 5,737,747 A | 4/1998 | Vishlitzky et al. | |
| 6,269,382 B1 | 7/2001 | Cabrera et al. | |
| 7,171,532 B2 | 1/2007 | Kodama | |
| 7,467,282 B2 | 12/2008 | Rao et al. | |
| 7,765,329 B2 * | 7/2010 | Cruciani et al. | 709/250 |
| 7,904,886 B2 * | 3/2011 | Dufour et al. | 717/124 |
| 7,974,950 B2 | 7/2011 | Kaczmarski et al. | |
| 8,013,738 B2 | 9/2011 | Donovan et al. | |
| 8,170,985 B2 | 5/2012 | Zimran et al. | |
| 8,170,990 B2 | 5/2012 | Shitomi | |
| 8,645,645 B2 * | 2/2014 | Kamei et al. | 711/161 |
| 2005/0246386 A1 | 11/2005 | Sullivan et al. | |
| 2007/0033340 A1 | 2/2007 | Tulskie et al. | |
| 2007/0174580 A1 | 7/2007 | Shulga | |
| 2007/0185938 A1 * | 8/2007 | Prahlad et al. | 707/204 |
| 2008/0010325 A1 | 1/2008 | Yamakawa | |
| 2008/0313236 A1 * | 12/2008 | Vijayakumar et al. | 707/200 |
| 2011/0054841 A1 * | 3/2011 | Wang | 702/182 |
| 2011/0078220 A1 * | 3/2011 | Nonaka et al. | 707/827 |
| 2013/0013565 A1 * | 1/2013 | Oza | 707/640 |
| 2014/0101385 A1 * | 4/2014 | Kamei et al. | 711/114 |
| 2015/0199375 A1 * | 7/2015 | Prahlad et al. | 707/610 |

* cited by examiner

TIER MANAGEMENT TABLE

| MOUNTING PATH | FSID | TIER |
|---|---|---|
| /EXPORT | 0x01 | 0x00 |
| /Tier1 | 0x01 | 0x0F |
| /Tier2 | 0x02 | 0x11 |

OBJECT MANAGEMENT TABLE

| OBJECT NAME | PSEUDO FS INODE NUMBER | FSID | REAL FS INODE NUMBER |
|---|---|---|---|
| FILE1 | 0x0001 | 0x01 | 0x12345 |
| /DIR/FILE2 | 0x0002 | 0x02 | 0x12346 |

1210   1220   1230   1240

DATA MIGRATION SYSTEM AND DATA MIGRATION METHOD

CROSS-REFERENCE TO RELATED PATENT APPLICATIONS

Japan Priority Application 2009-104644, filed Apr. 23, 2009 including the specification, drawings, claims and abstract, is incorporated herein by reference in its entirety. This application is a Continuation of U.S. application Ser. No. 12/490,047, filed Jun. 23, 2009, incorporated herein by reference in its entirety.

CROSS-REFERENCE TO RELATED APPLICATION

This application relates to and claims priority from Japanese Patent Application No. 2009-104644 filed on Apr. 23, 2009, the entire disclosure of which is incorporated herein by reference.

BACKGROUND OF THE INVENTION

The present invention relates to a technique for migrating files to a file server, which performs optimum deployment of files, according to the characteristics of a file system.

Currently, storage devices having various types of performance have been developed, and moreover there may be differences in performance between the volumes which make up a storage device. Generally, volumes whose performance is high are high in price, so that, using them, it is not possible to obtain any very high capacity. On the other hand, volumes whose performance is low are cheap in price, so that, using them, it is possible to obtain a high capacity.

For the purpose of reducing the cost entailed by the storage device and so on, there has been proposed a per se known data management method which is endowed with a so called HSM (Hierarchical Storage Management) function, with which the files are optimally deployed utilizing a plurality of such volumes whose characteristics are different from one another. With such an HSM function, files which are frequently utilized by the file system program are moved to "high speed—high price" volumes, while files which are not utilized very often are moved to "low speed—low price" volumes. Moreover, with such an HSM function, this moving of these files is hidden from the client. By controlling the file storage functions in this manner according to an HSM function, it becomes possible to reduce the costs associated with storage.

In Japanese Patent Document JP-A-2008-15984, there is disclosed a data migration method in which, when partially or completely replacing some system due to deterioration or the like of a file server or of a storage device, a volume to which an HSM function is applied is appropriately migrated. With this data migration method, it is distinguished whether or not a file which is in the first tier storage of the migration source file server is a stub file, and, if it is a stub file, then data is read out from the second tier storage using the address information which is stored in this stub file, and this data is written to the second tier storage of the migration destination file server. And the attribute information which is stored in this stub file on the migration source file server is read in, a stub file is created in the first tier storage of the migration destination file server, and this attribute information is written thereinto. The above processing is performed by utilizing the HSM interface. By using the data migration method disclosed in the above identified Patent Document, it is possible to migrate files from a migration source file server which has an HSM interface to a migration destination file server which maintains a tiered structure, and to migrate these files on the basis of the file deployment rules of the migration source.

With the data migration method disclosed in the above identified Patent Document, if the file server which is the subject of replacement does not support any HSM function, in other words if it is not provided with any HSM interface, then it is not possible to acquire any tier information about the migration source files (such as whether a file is on the first tier, or whether it is on the second tier, or the like). Accordingly, it is not possible to arrange the files of the migration source in an appropriate manner upon the migration destination. Due to this, upon the storage device which is the migration destination, it is necessary to prepare a volume which has a capacity equal to the total amount of data stored upon the storage device which is the migration source. But preparation of such a volume using high priced storage is contrary to the spirit of HSM. Although it would also be acceptable to prepare this type of volume using low priced storage, in this case, files which are frequently used come to be arranged upon the new volume in a manner such that the performance directly after migration is unsatisfactory. Moreover, if all of the files are (undesirably) migrated to a single tier, then the performance may decrease very sharply, since there is a possibility that, for files which have not been deployed to an appropriate tier, moving between tiers will occur very frequently directly after migration.

SUMMARY OF THE INVENTION

In consideration of the circumstances detailed above, it is an object of the present invention to provide a data migration system and a data migration method, which make it possible to migrate files to appropriate tiers, even from a migration source file server which does not have an HSM interface.

In the present invention, in order to migrate files while paying attention to their tiers, even from a migration source file server which does not have any HSM interface, a manager sets a migration policy using attribute information which can be acquired with the standard file access interface which the file server program possesses. The destination tier for file storage upon the migration destination file server is determined, and data migration is performed, according to this policy and according to the attribute information which has been acquired.

Due to this it is possible, by combining a standard file access interface, to perform migration from a migration source file server which has no HSM interface to a migration destination file server which utilizes HSM, while considering the destination tier.

BRIEF DESCRIPTION OF THE DRAWINGS

FIG. 11 is a figure showing the internal structure of a tier management table, in this first embodiment;

FIG. 12 is a figure showing the internal structure of an object management table, in this first embodiment;

DESCRIPTION OF THE SPECIFIC EMBODIMENTS

Embodiments of the present invention will now be described, with particular attention being given to examples when migrating data from a migration source file server which does not have any HSM function, to a migration destination file server which does have an HSM function.

Embodiment 1

The flow of data migration processing in a first embodiment of the present invention will now be explained.

(1) A manager sets a migration policy as a combination of attribute information which can be acquired with a standard file access interface, such as file creation time, last file update time, last file access time, file size, and so on, and starts the migraton. At this time, when issuing an attribute information request to the migration source file server, as for example for the last file access time, it will be acceptable not to utilize this attribute information if there is a possibility that the last file access time may (undesirably) be changed to the time at which this request has been issued.

(2) The data migration device issues an attribute information acquisition request to the migration source file server, and acquires the attribute information for the file which is the subject for migration.

(3) The data migration device issues a file creation request to the migration destination file server, and creates a file in a temporary state in a pseudo file system. Here, this file in a temporary state is upon a pseudo file system, and is in a state in which the real file system in which the file is present, and the inode number of the real file system, are not determined. However, the fact that this file is in a temporary state is hidden from the client and the data migration device, so that it is handled as a normal file.

(4) The data migration device issues an attribute information setting request in order to set the attribute information which has been acquired by (2) for the file in a temporary state on the migration destination file server.

(5) The migration destination file server determines a file storage destination tier (i.e. a volume) on the basis of the attribute information which has been received from the data migration device, and on the basis of the migration policy which was set in (1).

(6) The migration destination file server sets the tier which was determined in (5), creates a file in the real file system upon the migration destination file server, and sets the attribute information which was received in (5).

(7) The data migration device issues a data read request to the migration source file server, and reads out the data from the migration source file.

(8) The data migration device issues a data write request to the migration destination file server, and writes the data into the file upon the migration destination file server which was created in (6).

In the following, this first embodiment will be described in detail.

Figure 1:
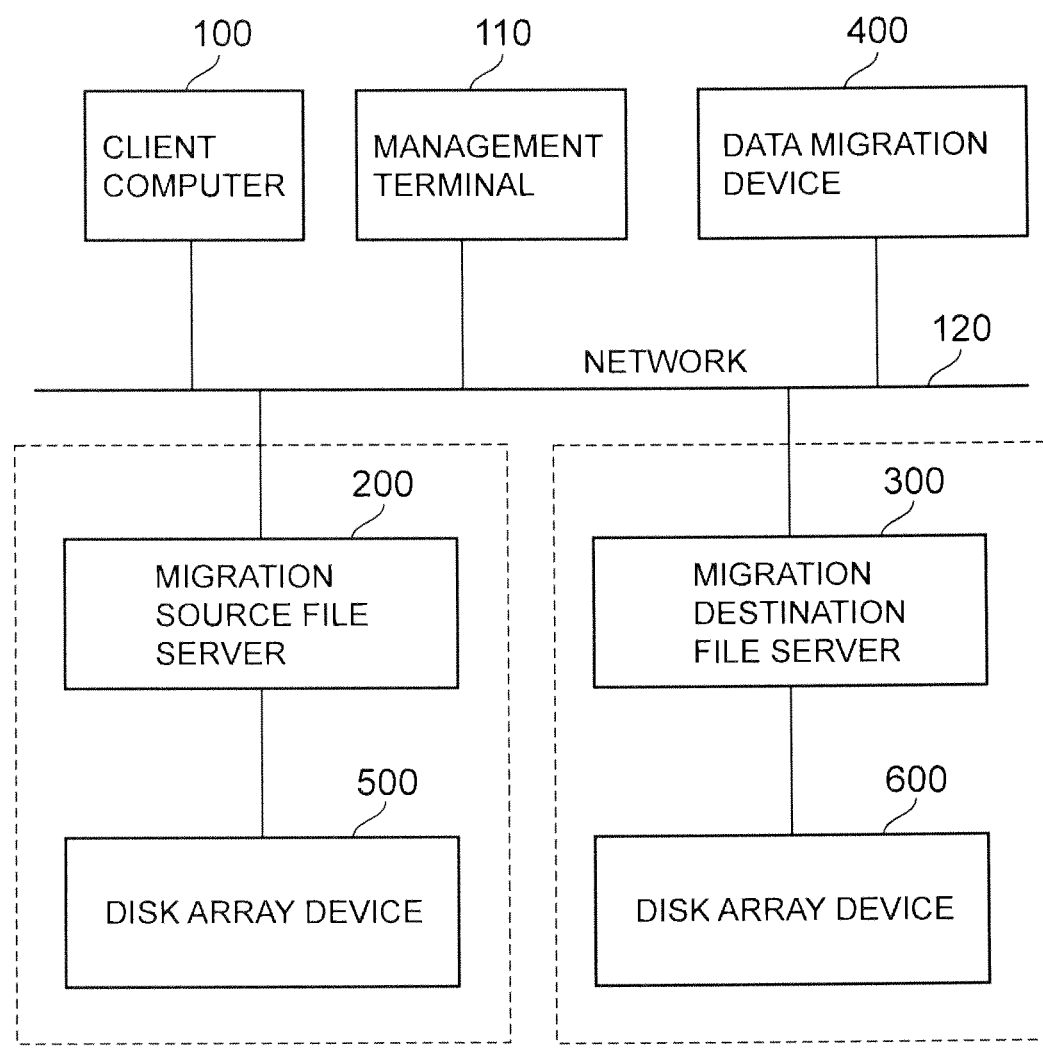
FIG. 1 is a figure showing an example of the structure of a file sharing system according to a first embodiment.

FIG. 1 is a block diagram showing an example of the structure of the file sharing system according to this embodiment.

A client computer 100 is a computer which is used by a user who employs a file sharing service provided by a migration source file server 200 or a migration destination file server 300.

A management terminal 110 is a computer which manages a data migration device 400. This management terminal 110 is used by a manager who manages the migration source file server 200, the migration destination file server 300, and the data migration device 400.

The migration source file server 200 is a computer which supplies file sharing service to the client computer 100. Moreover, this migration source file server 200 is a file server which constitutes the migration source when migrating data to the migration destination file server 300.

The migration destination file server 300 is another computer which supplies file sharing service to the client computer 100. Moreover, this migration destination file server 300 is a file server which constitutes the migration destination when migrating data from the migration source file server 200.

The data migration device 400 is a computer which migrates data from the migration source file server 200 to the migration destination file server 300.

A network 120 is a network which mutually connects together the client computer 100, the management terminal 110, the migration source file server 200, the migration destination file server 300, and the data migration device 400. This network 120 may, for example, be a LAN (Local Area Network).

A disk array device 500 is a storage device which stores data read or written by the client computer 100 or the data migration device 400 via the migration source file server 200.

And a disk array device 600 is a storage device which stores data read or written by the client computer 100 or the data migration device 400 via the migration destination file server 300.

Figure 2:
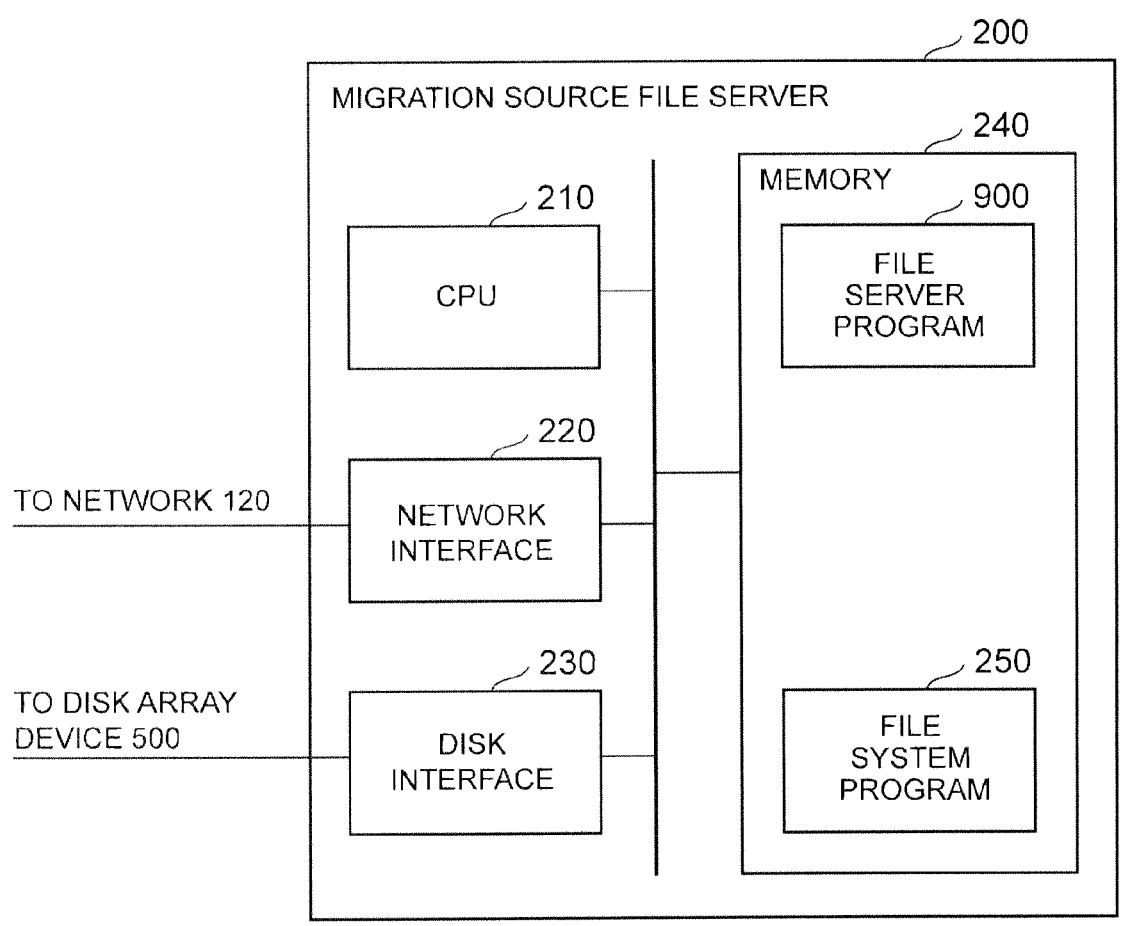
FIG. 2 is a figure showing the internal structure of a migration source file server of this first embodiment.

The disk array device 500 and the migration source file server 200, and the disk array device 600 and the migration destination file server 300 may be coupled together using a SAN (Storage Area Network), or may be directly coupled together. Moreover, it would also be acceptable for the disk array device 500 and the migration source file server 200 to be constituted as a single device (such as, for example, NAS: Network Attached Storage) which fulfils both of their functions. In a similar manner, the disk array device 600 and the migration destination file server 300 may be constituted as a single device which fulfils both of their functions. FIG. 2 is a block diagram showing the internal structure of the migration source file server 200.

The migration source file server 200 is a computer which comprises a CPU 210, a network interface 220, a disk interface 230, a memory 240, and a communication path (for example, a bus) which connects these elements together internally.

The CPU 210 executes a program stored in the memory 240. The network interface 220 is used for communication between this migration source file server 200 and the client computer 100 or the data migration device 400. The disk interface 230 is used for communication between this migration source file server 200 and the disk array device 500. The memory 240 stores programs and data. For example, a file server program 900 and a file system program 250 and so on may be stored.

The file server program 900 is a program (for example an NFS server program) which supplies file sharing service to the client computer 100.

And the file system program 250 is a program which manages a migration source file system 540 stored upon the disk array device 500.

Figure 3:
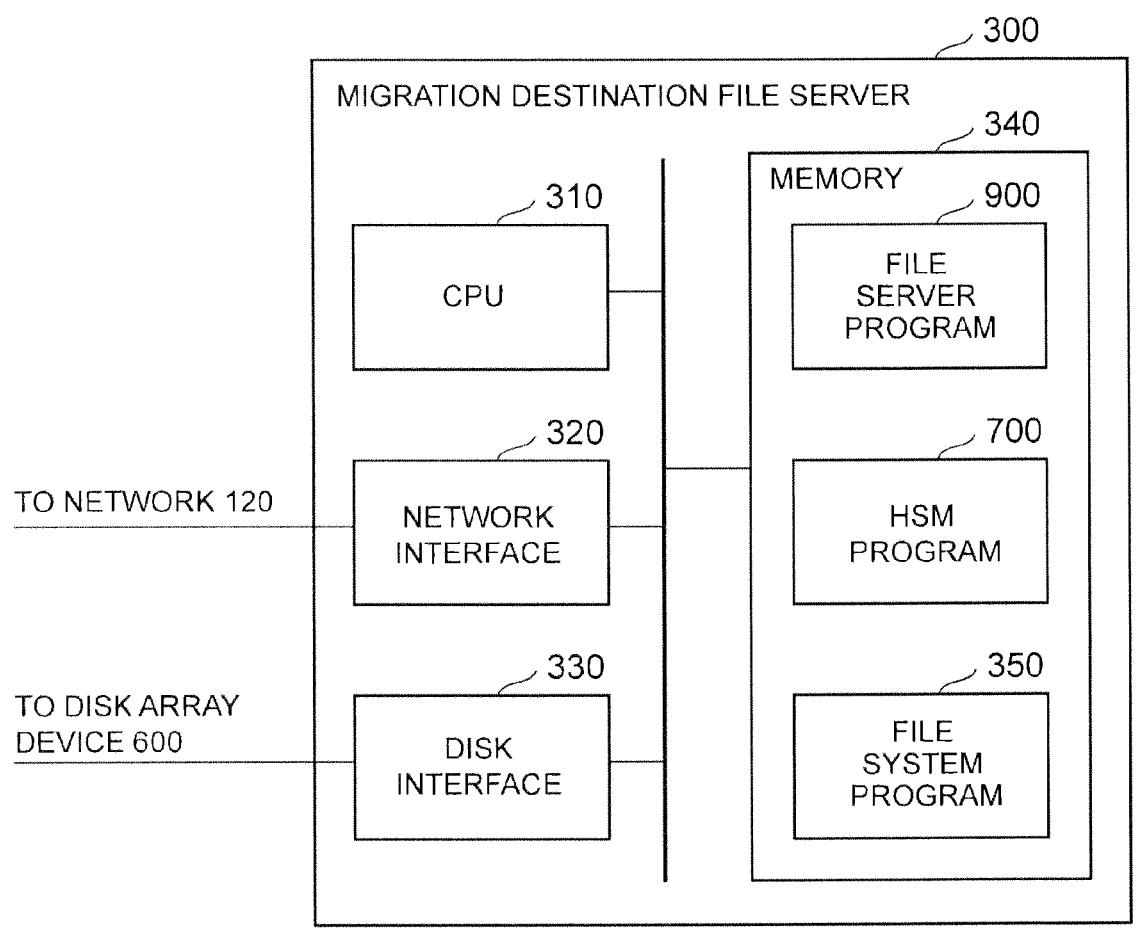
FIG. 3 is a figure showing the internal structure of a migration destination file server of this first embodiment.

FIG. 3 is a block diagram showing the internal structure of the migration destination file server 300.

The migration destination file server 300 is a computer which comprises a CPU 310, a network interface 320, a disk interface 330, a memory 340, and a communication path (for example, a bus) which connects these elements together internally.

The CPU 310 executes a program stored in the memory 340. The network interface 320 is used for communication between this migration destination file server 300 and the client computer 100 or the data migration device 400. The disk interface 330 is used for communication between this migration destination file server 300 and the disk array device 600. Programs and data are stored in the memory 340 of this migration destination file server 300. For example, a file server program 900, an HSM program 700, a file system program 350, and so on may be stored.

The HSM program 700 constructs a pseudo file system 660 using a real file system A670 and a real file system B680 which are managed by the file system program 350. In this embodiment, in order to distinguish them from pseudo file systems, normal file systems will be termed "real file systems". Moreover, this HSM program 700 is a program which provides a function of, according to the file utilization or the like, moving files between the real file system A670 and the real file system B680 transparently from the point of view of the client computer 100.

And the file system program 350 is a program which manages the real file system A670 and the real file system B680 stored upon the disk array device 600.

Figure 4:
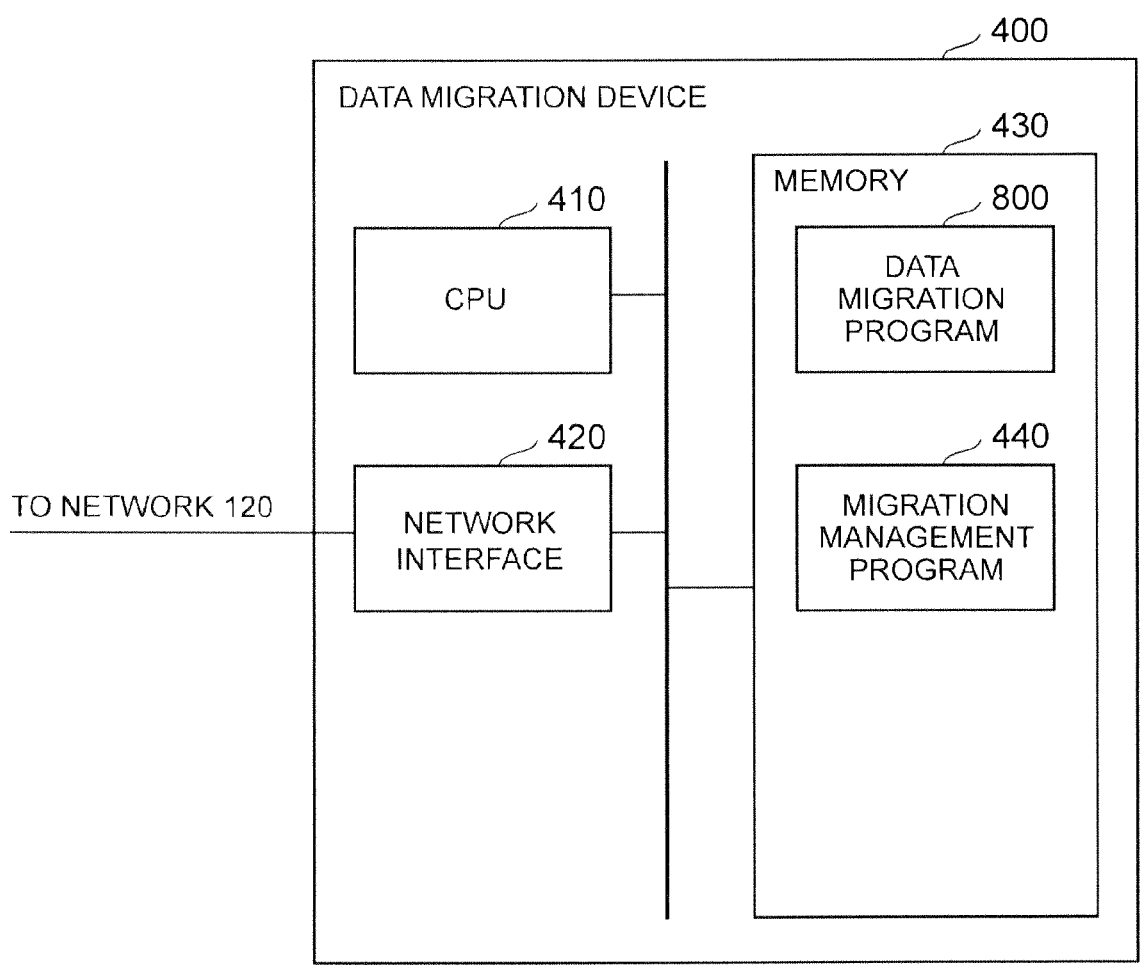
FIG. 4 is a figure showing an example of a structure of a data migration device of this first embodiment.

FIG. 4 is a block diagram showing the structure of the data migration device 400. This data migration device 400 is a computer which comprises a CPU 410, a network interface 420, a memory 430 which stores programs and data, and a communication path (for example, a bus) which connects these elements together internally.

The CPU 410 executes a program stored in the memory 430. The network interface 420 is used for communication between this data migration device 400 and the management terminal 110, the migration source file server 200, and the migration destination file server 300. Programs and data are stored in the memory 440 of this migration destination file server 400. For example, a data migration program 800 and a migration management program 440 and so on may be stored.

The data migration program 800 is a program which migrates data upon the migration source file server 200 to the migration destination file server 300 by communicating with the migration source file server 200 and the migration destination file server 300.

And the migration management program 440 is a program which supplies to the management terminal 110 an interface which specifies to the manager information which is needed for performing data migration (for example, a migration policy or a migration subject directory tree). Moreover, this migration management program 440 is a program which supplies an interface for receiving input of information specified by the manager and executing a data migration program 800. Here by an interface is meant, for example, a screen for the manager to perform operation (typically, a GUI (Graphical User Interface).

Figure 5:
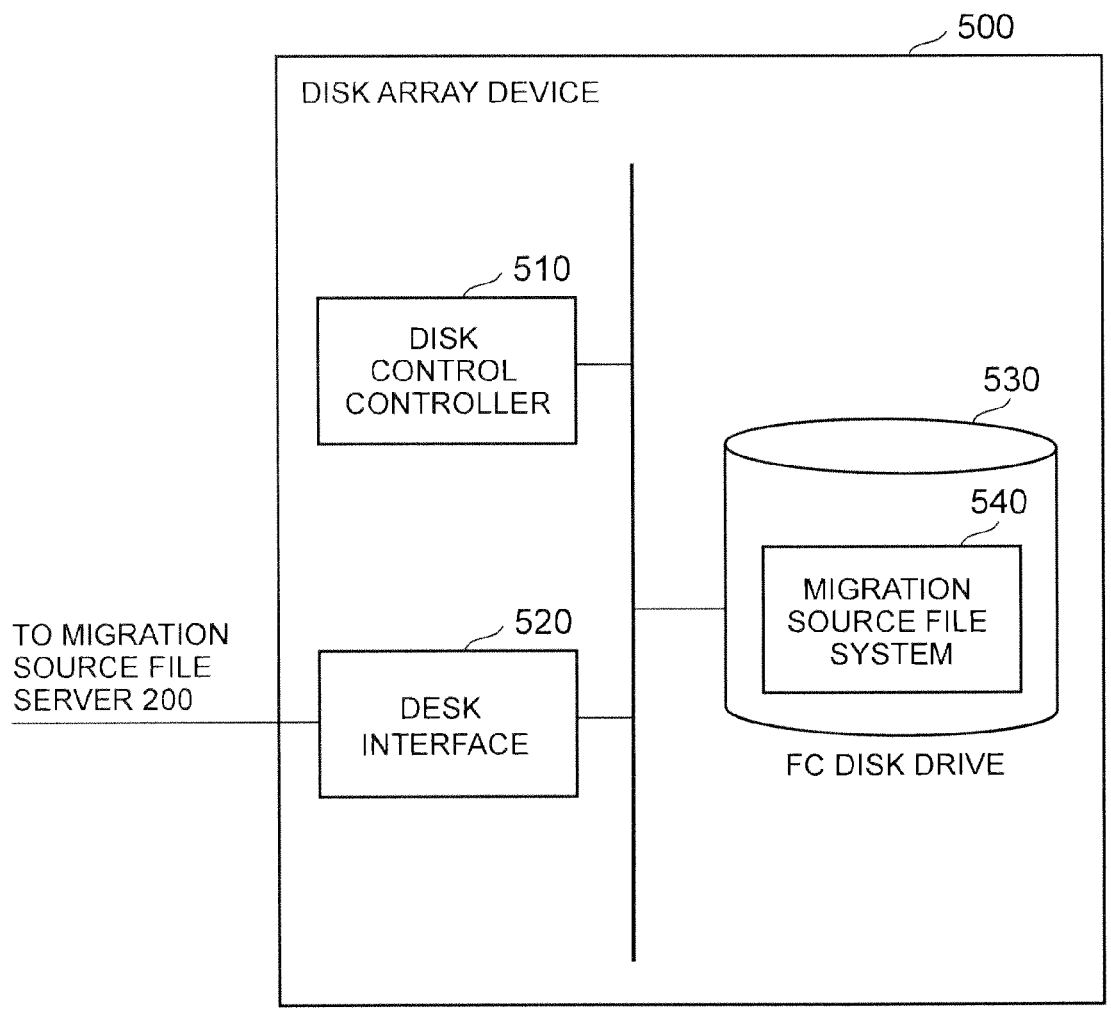
FIG. 5 is a figure showing the internal structure of a disk array device which is used by the migration source file server of this first embodiment.

FIG. 5 is a block diagram showing the structure of the disk array device 500.

This disk array device 500 comprises a disk control controller 510, a disk interface 520, and a FC (Fiber Channel) disk drive 530.

The disk controller 510 obtains input and output requests for the migration source file server 200 via the disk interface 520. And, on the basis of such input and output requests, the disk controller 510 inputs and outputs data to and from the FC disk drive 530, for example by block units.

The disk interface 520 is used for communication between the disk array device 500 and the migration source file server 200.

And the FC disk drive 530 is a disk drive for storing data read and written by the migration source file server 200. A migration source file system 540 is stored upon this FC disk drive 530. It should be understood that this FC disk drive 530 may not be a FC type drive; it may be a SATA (Serial Advanced Technology Attachment) disk drive, or may be some other type of disk drive.

Figure 6:
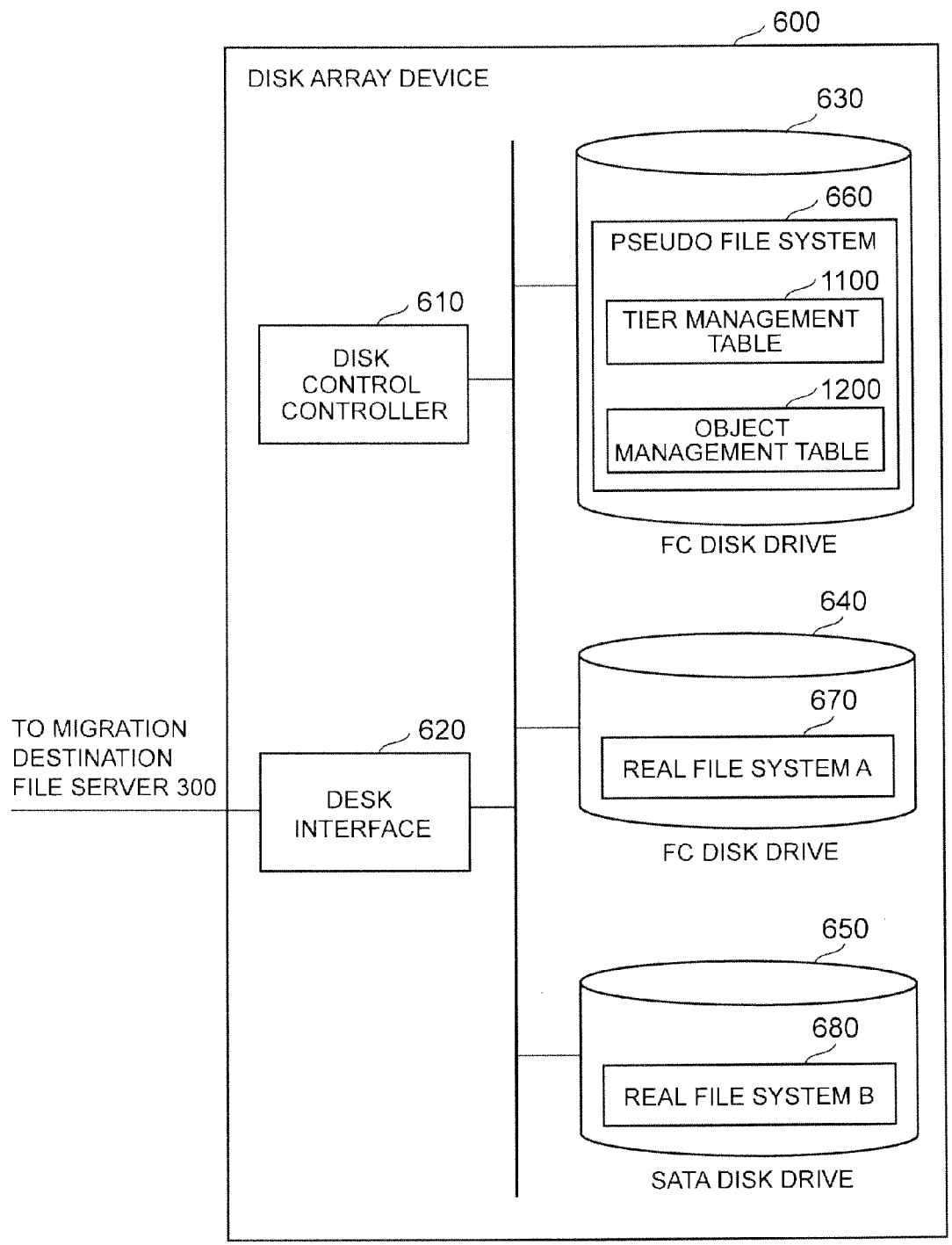
FIG. 6 is a figure showing the internal structure of a disk array device which is used by the migration destination file server of this first embodiment.

FIG. 6 is a block diagram showing the structure of the disk array device 600.

This disk array device 600 comprises a disk controller 610, a disk interface 620, FC disk drives 630 and 640, and a SATA disk drive 650.

The disk controller 610 obtains input and output requests for the migration destination file server 300 via the disk interface 620. And, on the basis of such input and output requests, the disk control controller 610 inputs and outputs data to and from the FC disk drive 630, for example by block units.

The disk interface 620 is used for communication between the disk array device 600 and the migration destination file server 300.

The FC disk drives 630 and 640 and the SATA disk drive 650 are disk drives for storing data read and written by the migration destination file server 300. The pseudo file system 660 is stored upon the FC disk drive 630. The real file system A670 is stored upon the FC disk drive 640. And the real file system B680 is stored upon the SATA disk drive 650.

It should be understood that the disk drives upon which the real file system A670 and the real file system B680 which constitute the pseudo file system 660 are stored may be disk drives having different characteristics, such as performance, capacity, price, and so on, in order to provide an HSM function.

Accordingly, the FC disk drive 640 and the SATA disk drive 650 may be disk drives of some other type respectively. Moreover, the FC disk drive 630 also may not be a FC disk drive, but may be a SATA (Serial Advanced Technology Attachment) disk drive, or may be a disk drive of some other type.

Furthermore, although typically a disk drive of high performance (for example, a FC disk drive) is used for the disk drive upon which the pseudo file system 660 is stored, since it is frequently referred to when the client computer 100 accesses the real file system A670 or the real file system B680, this is not essential: it may be any type of disk drive.

Figure 7:
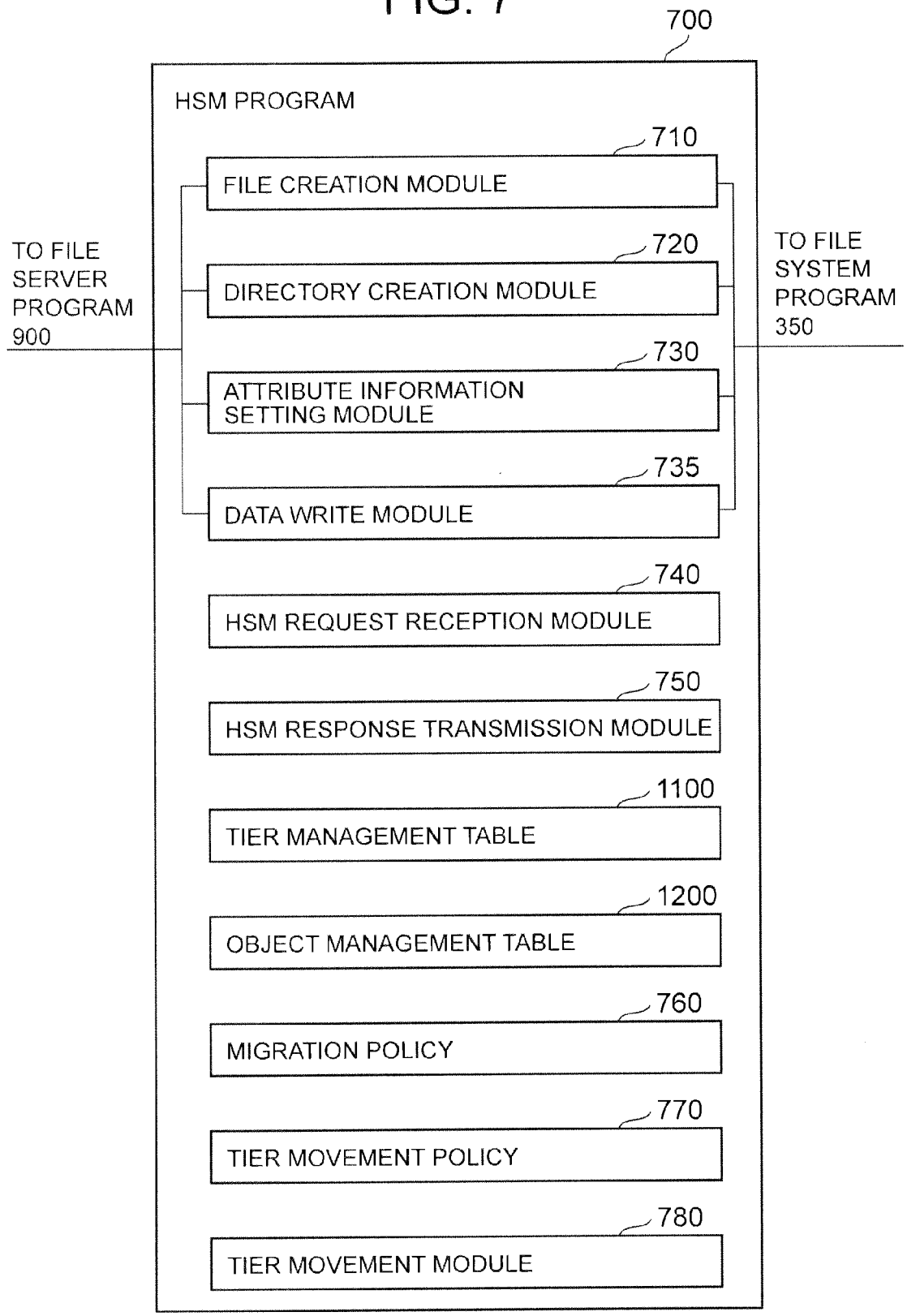
FIG. 7 is a figure showing the internal structure of an HSM program, in this first embodiment.

FIG. 7 is a block diagram showing the structure of the HSM program 700.

This HSM program 700 comprises a file creation module 710, a directory creation module 720, an attribute information setting module 730, a data write module 735, an HSM request reception module 740, an HSM response transmission module 750, a tier management table 1100, an object management table 1200, a migration policy 760, a tier movement policy 770, and a tier movement module 780.

The file creation module 710 is executed by the CPU 310 of the migration destination file server 300 when a file creation request has arrived from the client computer 100 or the data migration device 400 via the file server program 900. This file creation module 710 adds an entry to the object management table 1200, and creates a file in a temporary state upon the migration destination file server 300. The directory creation module 720 is executed by the CPU 310 of the migration destination file server 300 when a directory creation request has arrived from the client computer 100 or the data migration device 400 via the file server program 900. This directory creation module adds an entry to the object management table 1200, and creates a directory in a temporary state upon the migration destination file server 300.

The attribute information setting module 730 is executed by the CPU 310 of the migration destination file server 300 when an attribute information setting request has arrived from the client computer 100 or the data migration device 400 via the file server program 900. This attribute information setting module 730 refers to the object management table 1200, and, if the file or the directory which is the subject of attribute information setting is a file in a temporary state or a directory in a temporary state, performs attribute information setting processing after having created a real file upon a tier determined on the basis of the migration policy.

The data write module 735 is executed by the CPU 310 of the migration destination file server 300 when a data write request has arrived from the client computer 100 or the data migration device 400 via the file server program 900. This data write module 735 performs processing to write data which has been read in from the migration source file server 200 to a file which is created in the real file system of the migration destination file server 300.

The HSM request reception module 740 receives migration destination tier information acquisition requests and migration policy setting requests which are transmitted from the data migration device 400. If a request which has been received is a migration destination tier information acquisition request, then the module 740 refers to the tier management table 1100, and, after having created a list of tiers for migration destinations, passes this list as an input to the HSM response transmission module 750. And, if a request which has been received is a migration policy setting request, then the module 740 sets the migration policy to the migration policy 760.

And the HSM response transmission module 750 transmits results for migration destination tier information acquisition requests to the data migration device 400, and transmits whether or not a setting of a migration policy has been completed normally.

The tier management table 1100 is a table for managing the real file systems which constitute the pseudo file system 660.

And the object management table 1200 is a table for maintaining a correspondence between objects (files and directories) in the pseudo file system 660 and objects (files and directories) in the real file systems.

The migration policy 760 is a policy which is designated when the manager performs data migration. The tier of the migration destination is determined according to the conditions specified by this migration policy 760. For example, while the first tier file system consists of a disk device of high performance and high reliability, it is supposed to be the real file system A670 whose price is high and whose capacity is small; and, while the second tier file system is inferior in performance and reliability as compared with the first tier file system, it is supposed to be the real file system B680 whose price is low and whose capacity is large. By specifying the policy that "files whose size is larger than 100 MB and whose last update time is before 1 Jan. 2009 are to be migrated to the second tier", it is possible to cause files which are large and whose degree of importance is low to be migrated to the second tier file system which has surplus capacity.

The tier movement policy 770 is a policy which is applied when moving files between tiers. In this embodiment, this policy is for the case of moving files between the real file system A670 and the real file system B680.

Such movement between tiers is performed according to the conditions set by the tier movement policy 770. Moreover, when executing data migration processing without setting a migration policy, the data is migrated according to this tier movement policy 770. The tier movement policy 770 is set in advance by the manager, according to the performance and the reliability and the cost of the disk drive or drives which constitute the real file system A670 and the real file system B680. Like the migration policy, the tier movement policy 770 is set as one or more combinations of attribute information such as file creation time, last update time, last access time, file size, and so on. For example, the policy may be "move files which were created more than one month ago to the second tier file system".

It should be understood that a disk drive which provides high performance and high reliability at a high price may, for example, be a FC disk drive. Moreover, a disk drive which is cheaper but whose performance and reliability are inferior to such a disk drive may, for example, be a SATA disk drive or the like. Moreover it would also be acceptable to reduce the cost while maintaining performance and reliability, by building the first tier file system and/or the second tier file system according to RAID1 or RAID5, according to the application. Furthermore, it would also be acceptable for the file system to have three or more tiers.

The tier movement module 780 performs moving of files between the real file system A670 and the real file system B680 on the basis of the tier movement policy 770. This tier movement module 780 may operate according to a command from the manager, or may operate periodically (for example once per day) in an automatic manner.

Although this feature is not shown in FIG. 7, it should be understood that the HSM program 700 also has modules for processing other requests which the file server program 900 has received, such as data read requests and file delete requests and so on. Moreover, this HSM program 700 also includes modules having prior art type HSM functions, such as a tier moving module for moving files to different tiers, and so on.

Figure 8:
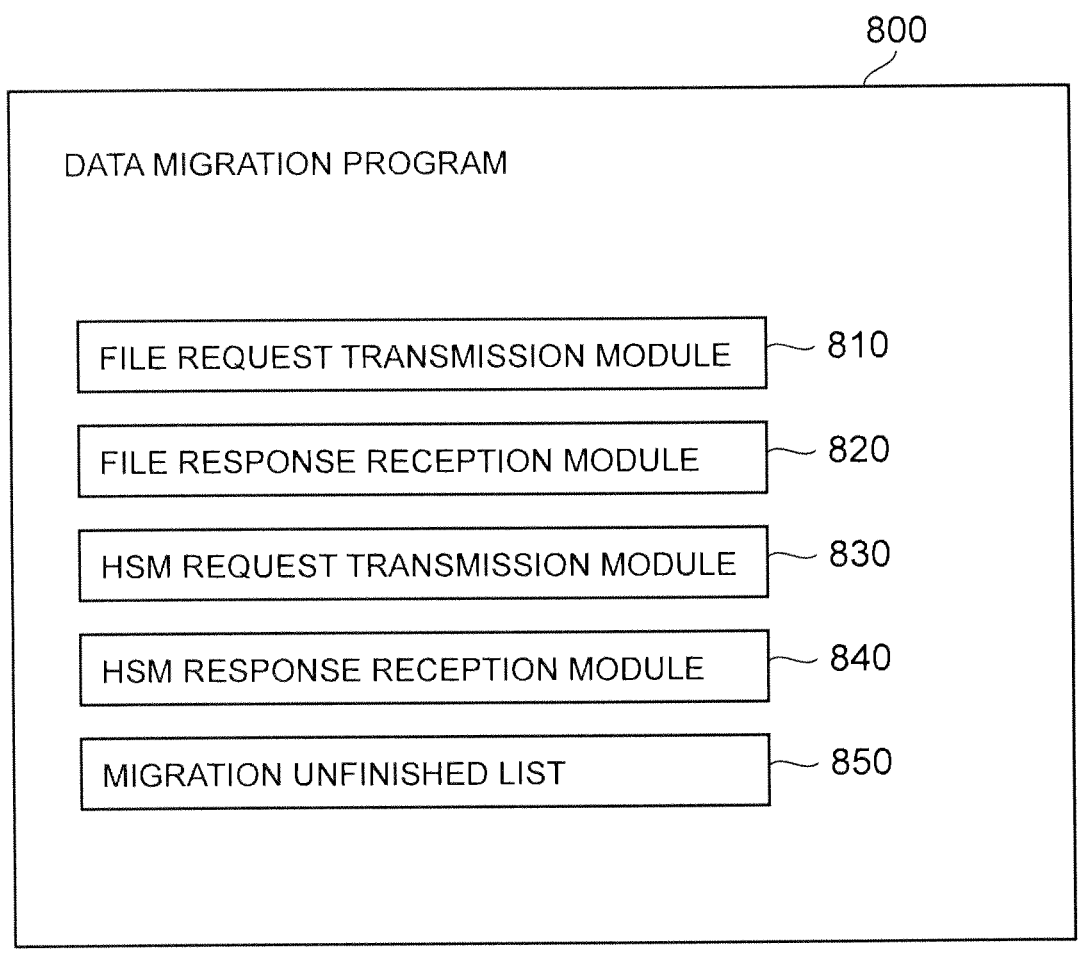
FIG. 8 is a figure showing the internal structure of a data migration program, in this first embodiment.

FIG. 8 is a block diagram showing the structure of the data migration program 800. This data migration program 800 comprises a file request transmission module 810, a file response reception module 820, an HSM request transmission module 830, an HSM response reception module 840, and a migration unfinished list 850. The file request transmission module 810 performs transmission of data read requests to the migration source file server 200 and transmission of data write requests to the migration destination file server 300.

The file response reception module 820 receives, from the migration source file server 200 or the migration destination file server 300, a response to a request which the file request transmission module 810 has transmitted.

The HSM request transmission module 830 transmits a migration destination tier information acquisition request or a migration policy setting request to the migration destination file server 300.

The HSM response reception module 840 receives, from the migration destination file server 300, a response to a request which the HSM request transmission module 830 has transmitted.

And the migration unfinished list 850 is a list which maintains identification information, such as the path name and so on, for a file upon the migration source file server 200, in order temporarily to postpone data migration processing for that file, due to a reason such as the client computer 100 acquiring an exclusive lock for that file or the like.

Figure 9:
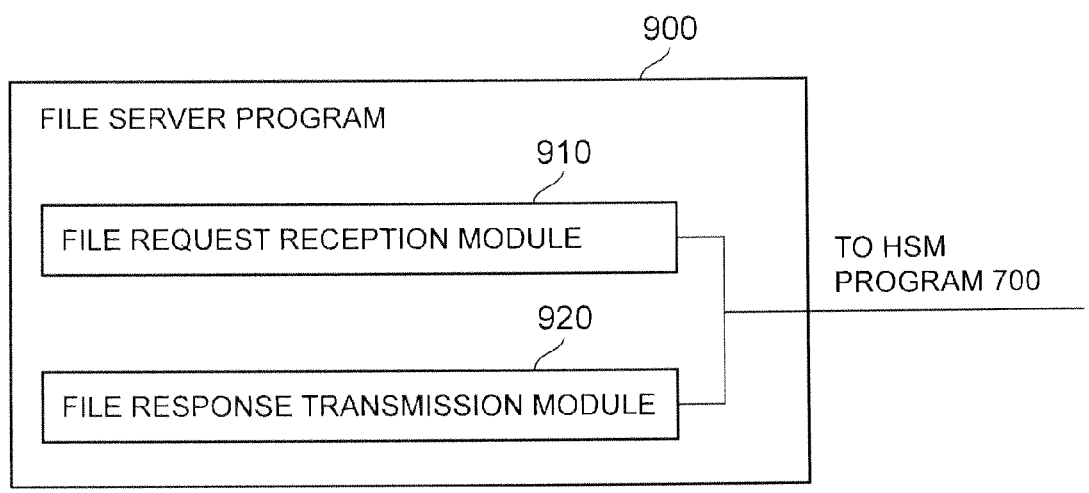
FIG. 9 is a figure showing the internal structure of a file server program, in this first embodiment.

FIG. 9 is a block diagram showing the structure of the file server program 900. This file server program 900 includes a file request reception module 910 and a file response transmission module 920.

The file request reception module 910 receives data read requests and data write requests which have been transmitted by the client computer 100 or the data migration device 400, and passes these requests to the HSM program 700 as inputs.

And the file response transmission module 920 receives the results of these data read requests and data write requests from the HSM program 700, and transmits these results to the client computer 100 or the data migration device 400.

Figure 10:
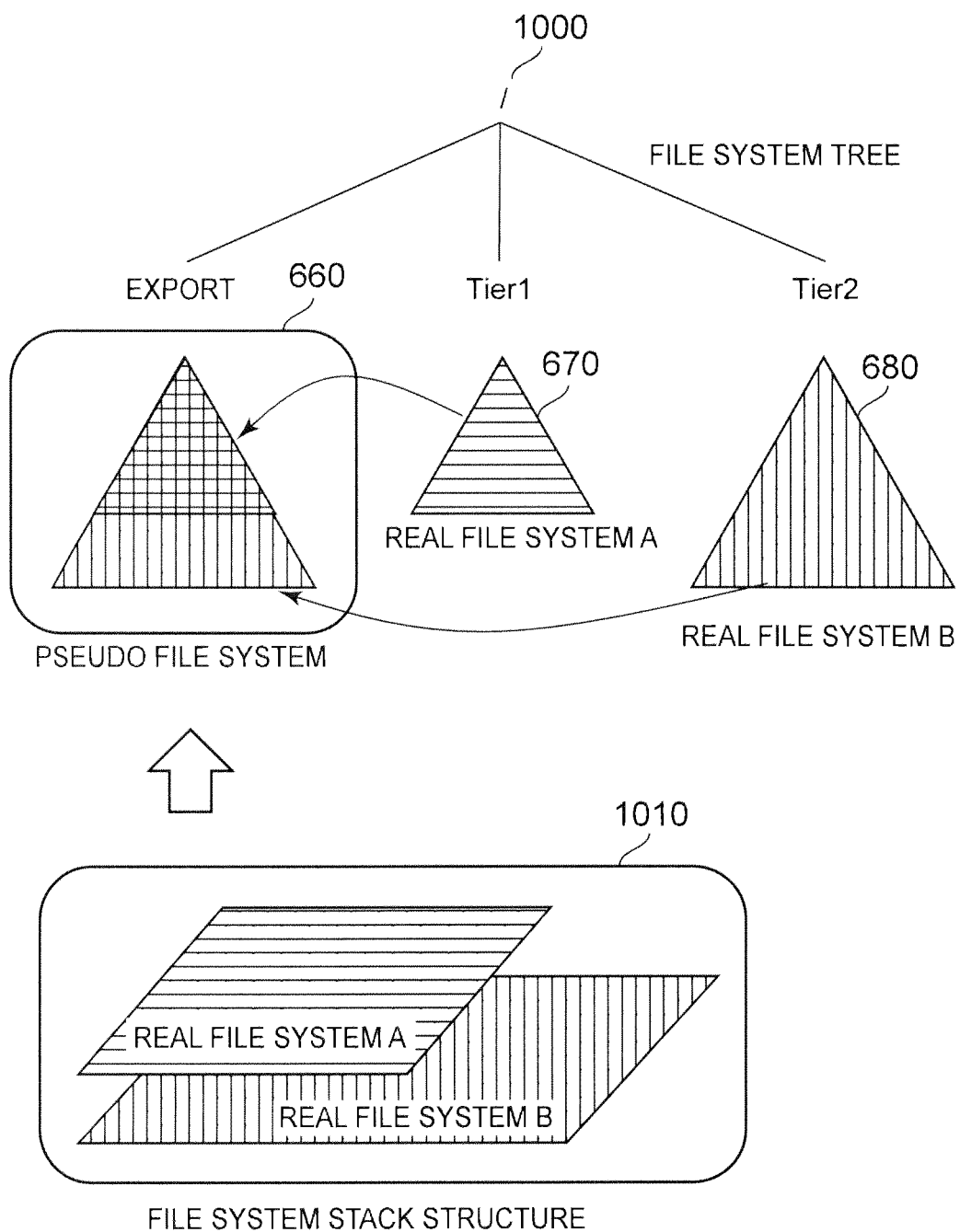
FIG. 10 is a figure showing the structure of a file system tree which provides an HSM function, in this first embodiment.

FIG. 10 is a schematic figure showing an example of the structure of a file system tree 1000, when the HSM function of this embodiment is employed.

This file system tree 1000 is a name space in a file system which is built up by the migration destination file server 300 and supplied to the client computer 100. The file system tree 1000 consists of a directory/(root) and, under this root directory, an EXPORT directory, a Tier1 directory, and a Tier2 directory. The real file system A670 is mounted in the Tier1 directory, and the real file system B680 is mounted in the Tier2 directory. With the HSM function of this embodiment, the Tier1 directory and the Tier2 directory are overlapped over the EXPORT directory. At this time, as shown in the file system stack structure 1010, a pseudo file system 660 is constituted by allocating the real file system A670 above and by allocating the real file system B680 below. The file server program 900 exports and supplies the EXPORT directory and below to the client computer 100.

FIG. 11 is a figure showing an example of the tier management table 1100. In this tier management table 1100, each entry consists of a mounting path which specifies the mounting position of the real file system (for example, of the real file system A670 or the real file system B680), a FSID 1120 which is a file system management ID, and a tier 1130 which specifies the tier of the file system. It should be understood that the higher and lower rankings of the tiers 1130 are specified by the manager when the operation of this HSM system is started. In order to construct the pseudo file system, for example, registration is performed with designating the real file system which is constituted by an FC disk drive as the higher ranking tier, and registration is performed with designating the real file system which is constituted by a SATA disk drive as a lower ranking tier. Entries are added to the tier management table 1100 by performing registration tasks of this type. In the example shown in FIG. 11, a tier designation 0x0F denotes the first tier, while a tier designation 0x11 denotes the second tier. Provided that the numerical values which indicate the tiers have an order from which the higher ranking tiers and lower ranking tiers can be identified, any values may be used. As shown in the example of FIG. 11, if the values are designated with gaps being left between them, then it will even be possible to cope with the provision of a new tier between the first tier and the second tier.

FIG. 12 is a figure showing an example of the object management table 1200.

In this object management table 1200, each entry consists of an object name 1210, a pseudo FS inode number 1220, an FSID 1230, and a real FS inode number 1240, and this table manages the correspondence relationship between these values. The object name 1210 specifies a file name or a directory name in the pseudo file system 660. The pseudo FS inode number 1220 is the inode number of this file or directory in the pseudo file system 660. The FSID 1230 is the ID of the real file system in which this file or directory is actually stored. And the real FS inode number 1240 is an inode number for uniquely specifying the file or directory in the real file system.

In this object management table 1200, a single entry corresponds to a single file or directory. A user who is using the client computer 100 designates the object name 1210, and thereby accesses the file or directory. At this time, the HSM program 700 specifies the entry which corresponds to this object name, and changes over the processing to the file system program 350.

Figure 13:
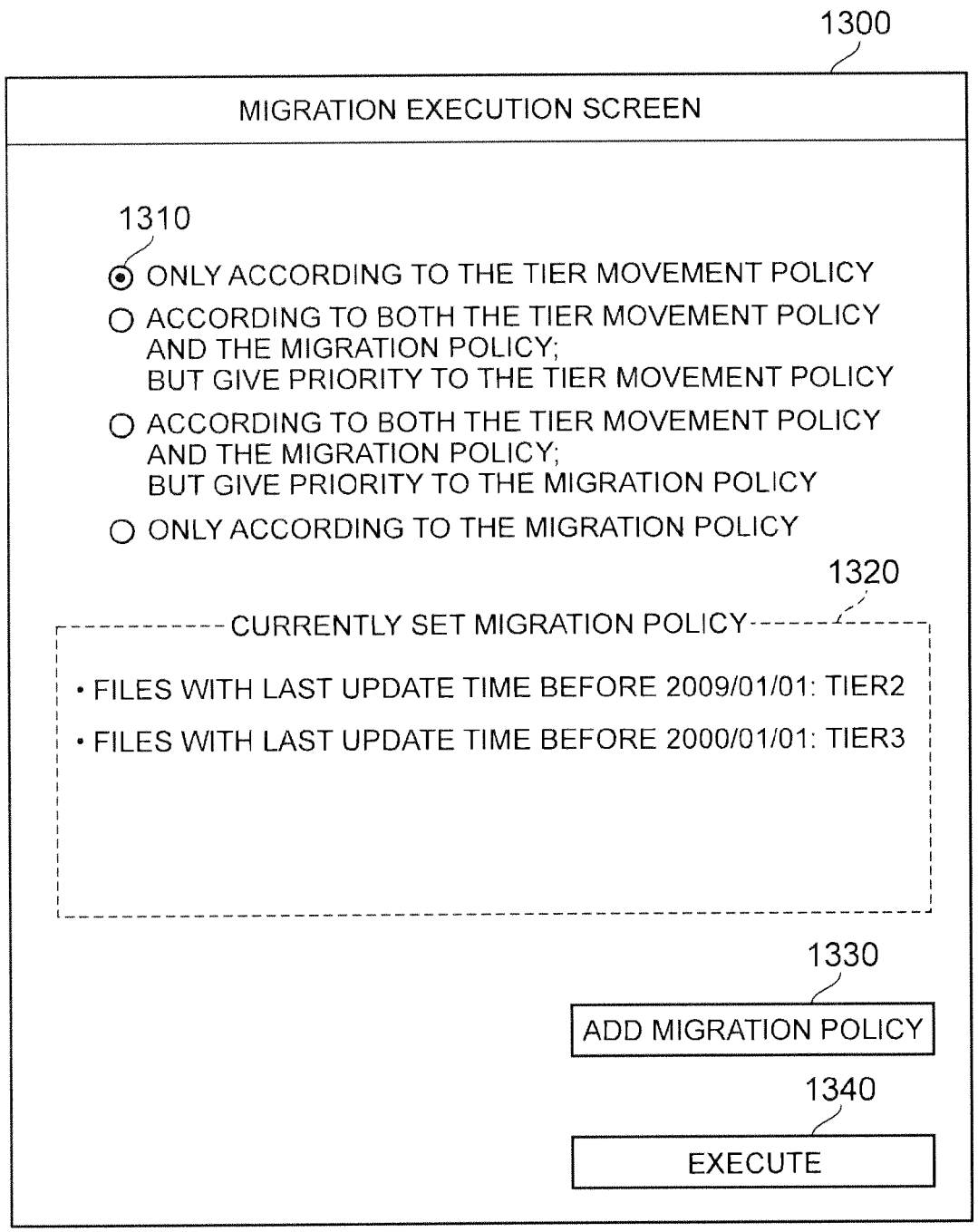
FIG. 13 is a figure showing an example of a migration execution screen, in this first embodiment.

FIG. 13 is an example of a migration execution screen which the migration management program displays upon the management terminal, in order for the manager to execute a migration.

This migration policy execution screen 1300 includes a radio button 1310 for exclusively selecting the priority order of the policies which are to be used during the migration, a text area 1320 for displaying the migration policy which is currently set, a button 1330 for adding a migration policy, and a button 1340 for executing the migration.

With this radio button 1310, the manager is enabled to select either to perform the migration only according to the tier movement policy of the migration destination file server, or to perform the migration according to both the tier movement policy and the migration policy of the migration destination file server, or to perform the migration only according to the migration policy of the migration destination file server. It should be understood that it would also be acceptable to arrange to select the priority levels of the tier movement policy and the migration policy of the migration destination file server with this radio button 1310.

When only the migration policy 760 or the tier movement policy 770 is being applied, then the files are migrated to the tier for which their attribute information satisfies the migration policy 760 or the tier movement policy 770. If a plurality of policies are set, then they may be applied in order from the policy for which the tier of the migration destination is the lowest.

If both the migration policy 760 and the tier movement policy 770 are being applied, and priority levels are set for them, then they are applied in order from that policy whose priority level is the higher. For example, if the priority level of the migration policy 760 is the higher, then the first migration policy 760 is applied, and, if the migration policy 760 is not satisfied, then the tier movement policy 770 is applied. When applying both the migration policy 760 and the tier movement policy 770, it would also be acceptable to arrange to combine both of these policies, and to apply them in order from that policy whose migration destination tier is the lower.

If no policy is present whose conditions are satisfied, then the files are migrated to the highest level tier.

When the button 1330 for adding a migration policy is pressed, then a migration policy setting screen 1400 is displayed, and it becomes possible to set a migration policy.

When the execute button 1340 is pressed, then the data migration program 800 is executed, and the migration is started.

It should be understood that it would also be acceptable to include the option "do not migrate" upon the pull down list 1310 for designating the migration destination tier, in order to create the policy of not migrating any file which satisfies the conditions, other than the tier which is operating.

Figure 14:
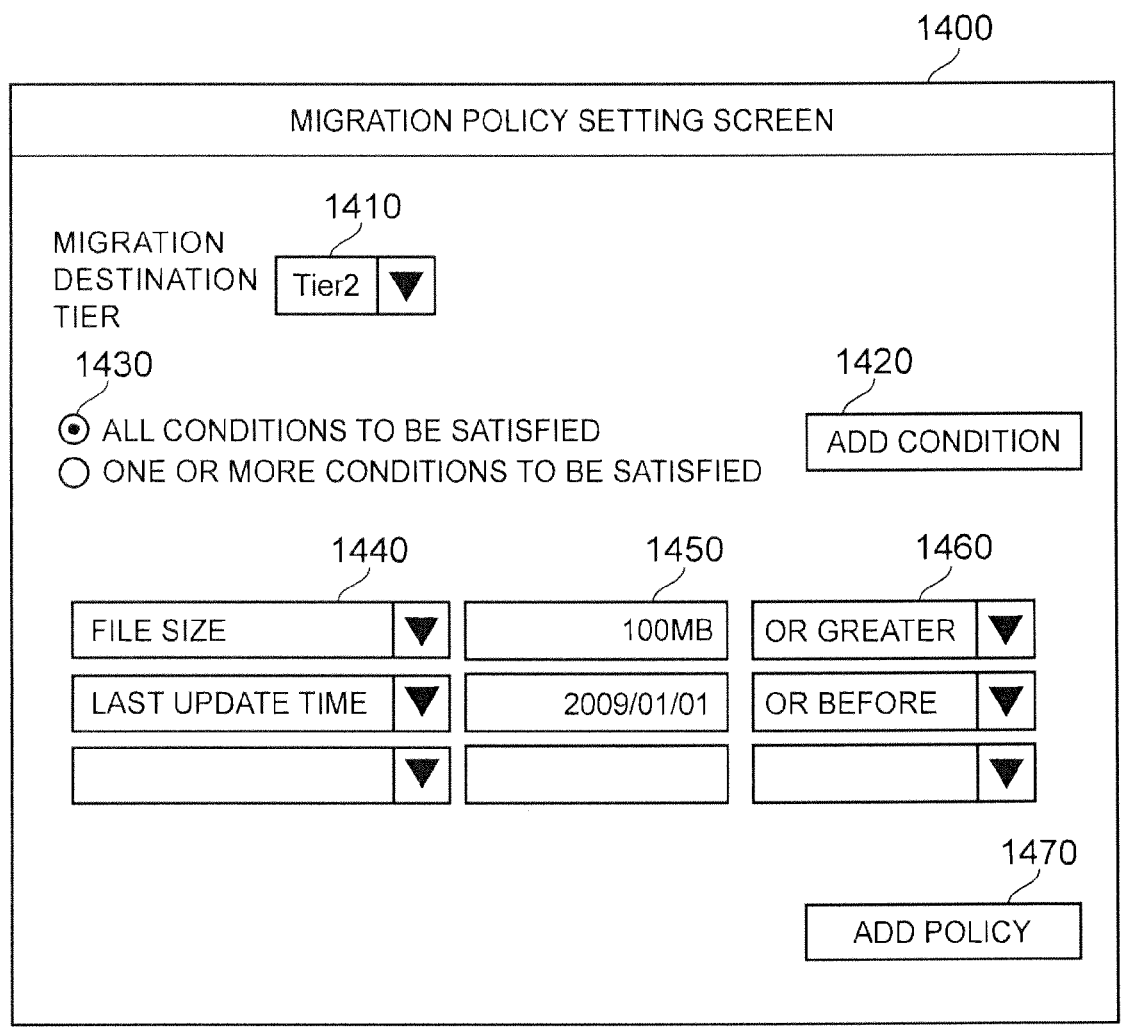
FIG. 14 is a figure showing an example of a migration policy setting screen, in this first embodiment.

FIG. 14 is an example of a migration policy setting screen which the migration management program displays upon the management terminal, in order to enable the manager to set a migration policy.

This migration policy setting screen 140 includes a pull down list 1410, a button 1420, a radio button 1430, a pull down list 1440, a text box 1450 and a pull down list 1460, and a button 1470.

The pull down list 1410 is pulled down for designating the tier of the migration destination. The button 1420 is a button for adding a condition to constitute a policy. The radio button 1430 is a radio button for selecting one or the other of whether it will be decided that this policy is matched if all of the conditions which make up this policy are satisfied, or it will be decided that this policy is matched if at least one of the conditions which make up this policy are satisfied. The pull down list 1440 is a pull down list for selecting the attribute information which is to be used for the condition. The attribute information may be file size, file creation time, last update time, last access time, or the like. The text box 1450 and the pull down list 1460 are for specifying the nature of the condition. And the button 1470 is a button for adding the migration policy.

FIG. 14 shows an example of addition of the migration policy that files whose size is larger than 100 MB and also whose last update time is on or before 2009 Jan. 1 are to be migrated to the second tier file system. When performing this migration, it would be acceptable to arrange to designate only one migration policy, as in the example shown in FIG. 13, or, in the case of more than two tiers, to arrange also to designate a migration policy in which files are migrated to a file system on a third tier, in combination.

In this case, for example, the policy for migrating files to the second tier file system is set, and then the migration policy addition button 1470 is pressed. Next, again, the migration policy setting screen is brought up, and the policy for migrating files to the file system on the third tier is set, and the migration policy addition button 1470 is pressed. And, when the manager presses the execute button 1340 and commands the migration to be executed, the migration is performed according to these two migration policies which have been added.

In the following, the processing flow when the system of this embodiment is performing data migration processing will be explained with reference to FIGS. 15 through 20.

Figure 15:
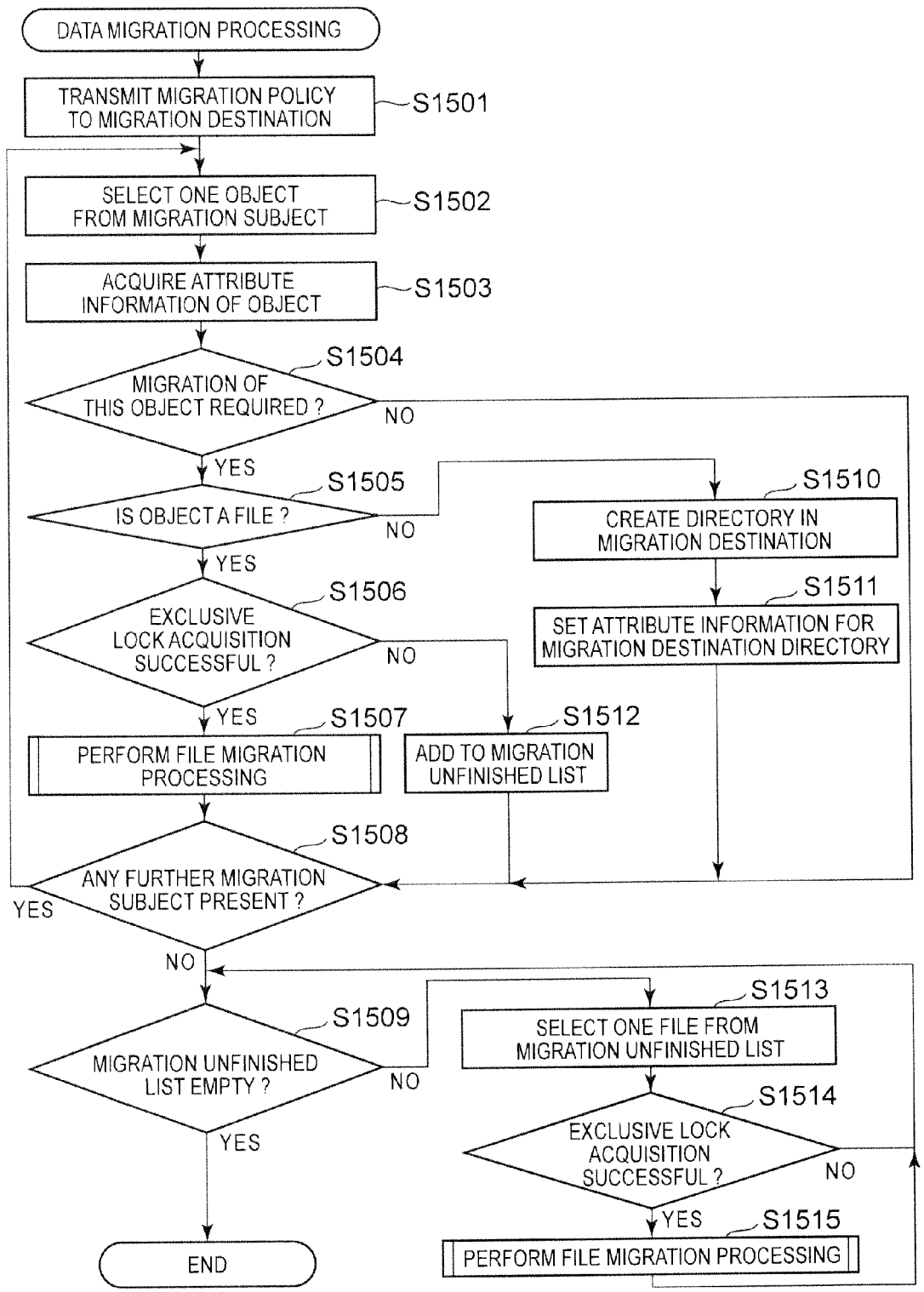
FIG. 15 is a figure showing an example of the processing by a data migration program, in this first embodiment.

FIG. 15 is an example of processing flow, showing the operation of the data migration program 800. This data migration program 800 is executed by the CPU 410 when a data migration command has been received from, for example, the management terminal 110. Information set by the manager related to a migration policy and a migration subject range (for example, the directory tree of the migration subject) is included in this data migration command. It should be understood that it would also be acceptable for the manager not to set any migration policy 760. In this case, the migration would be performed according to the tier movement policy 770.

First, the data migration program 800 issues a migration policy setting request from the HSM request transmission module 830 to the migration destination file server 300 (a step S1501). Due to this, the migration policy 760 of the migration destination file server 300 is set to the migration policy which has been set by the manager. If the manager has commanded that migration is to be performed only according to the tier movement policy of the migration destination file server, or if no migration policy has been set, then nothing is set.

Next, the data migration program 800 selects one object from the directory tree of the migration subject (a step S1502).

Next, the data migration program 800 issues an attribute information acquisition request from the file request transmission module 810 to the migration source file server 200, and acquires the attribute information for the selected object (a step S1503). If the file server program 900 is, for example, NFS (Network File System), then this attribute information acquisition request corresponds to the procedure "getattr".

And, on the basis of the attribute information which was acquired in the step S1503 and the migration policy which has been set by the manager, a decision is made (in a step S1504) as to whether or not it is necessary to migrate the object which was selected in the step S1502. For example, if the manager has set the policy that "files whose last update time is before 2000 Jan. 1 are not to be migrated", then migration of a file whose last update time is before 2000 Jan. 1 is not required (NO in the step S1504).

If it is necessary to migrate the object which was selected in the step S1502 (YES in the step S1504), then a decision is made (in a step S1505) as to whether or not this object is a file.

And, if the object which was selected in the step S1502 is a file (YES in the step S1505), then a lock acquisition request is issued to the migration source file server from the file request transmission module 810, and an attempt is made to acquire an exclusive lock upon that file (a step S1506). If the file server program 900 is, for example, NFS, then this lock acquisition request corresponds to the procedure "lock". By this processing, it is ensured that the file for which data is being migrated cannot be read or written from the client computer 100.

If the acquisition of an exclusive lock has succeeded (YES in the step S1506), then the data migration program 800 performs file migration processing (a step S1507). The details of this file migration processing will be described hereinafter with reference to FIG. 16.

When the file migration processing has been completed, the data migration program 800 checks whether or not any objects which are to be subjects of migration still remain (a step S1508).

If at least one migration subject is still present (YES in the step S1508), then another object from the directory tree of the migration subject is again selected (the step S1502).

However, if in the step S1506 the acquisition of an exclusive lock has failed (NO in the step S1506), then the path name of this file is added to the migration unfinished list 850 (a step S1512). If it has not been possible to acquire an exclusive lock, then there is a possibility that this file may be accessed by the client computer 100 or the like. Due to this, the migration of this file is postponed. This type of file is managed with the migration unfinished list 850. And the data migration program 800 checks whether or not any migration subject still remains (the step S1508).

On the other hand, if the object which has been selected in the step S1502 is a directory (NO in the step S1504), then a directory creation request is issued from the file request transmission module 810 to the migration destination file server 300, and a directory is created upon the migration destination file server (a step S1510). If the file server program 900 is, for example, NFS, then this lock acquisition request corresponds to the procedure "mkdir".

Next, the data migration program 800 issues an attribute information setting request from the file request transmission module 810 to the migration destination file server 300, and sets the attribute information for the migration subject directory (a step S1511).

Moreover, if migration of the object which was selected in the step S1502 is not necessary (NO in the step S1504), then the above described migration processing is skipped, and it is checked whether or not any further subject for migration still remains (a step S1508).

If no such further migration subject is present (NO in the step S1508), then the data migration program 800 checks whether or not the migration unfinished list 850 is empty (a step S1509).

If the migration unfinished list 850 is empty (YES in the step S1509), then the data migration processing is completed; while, if the migration unfinished list 850 is not empty (NO in the step S1509), then one file is selected from the migration unfinished list 805 (a step S1513). And a lock acquisition request is issued from the file request transmission module 810 to the migration destination file server, and an attempt is again made to acquire an exclusive lock (a step S1514).

If the acquisition of an exclusive lock has succeeded (YES in the step S1514), then the data migration program 800 performs the file migration processing (a step S1515), and then again checks whether or not the migration unfinished list is empty (the step S1509).

However, if the attempt at acquisition of an exclusive lock has failed (NO in the step S1514), then the data migration program 800 skips the migration of this file, and again checks whether or not the migration unfinished list is empty (the step S1509). It should be understood that it would also be acceptable to arrange, at this time, to notify the manager via the migration management program 440 that the migration of this file has not been performed. Or it would also be acceptable for the data migration program 800 to open this file in a read-only mode, and to perform processing for migration of this file as is.

Although exclusive processing of the files in data migration processing is a measure for permitting access from the client computer 100 as much as possible even when data is being migrated, it would also be acceptable, in order to ensure consistency between the file systems upon the migration source and upon the migration destination, to arrange to limit access by the client computer 100 by mounting the migration source file system 540 on the migration source file server 200 in read only mode.

Figure 16:
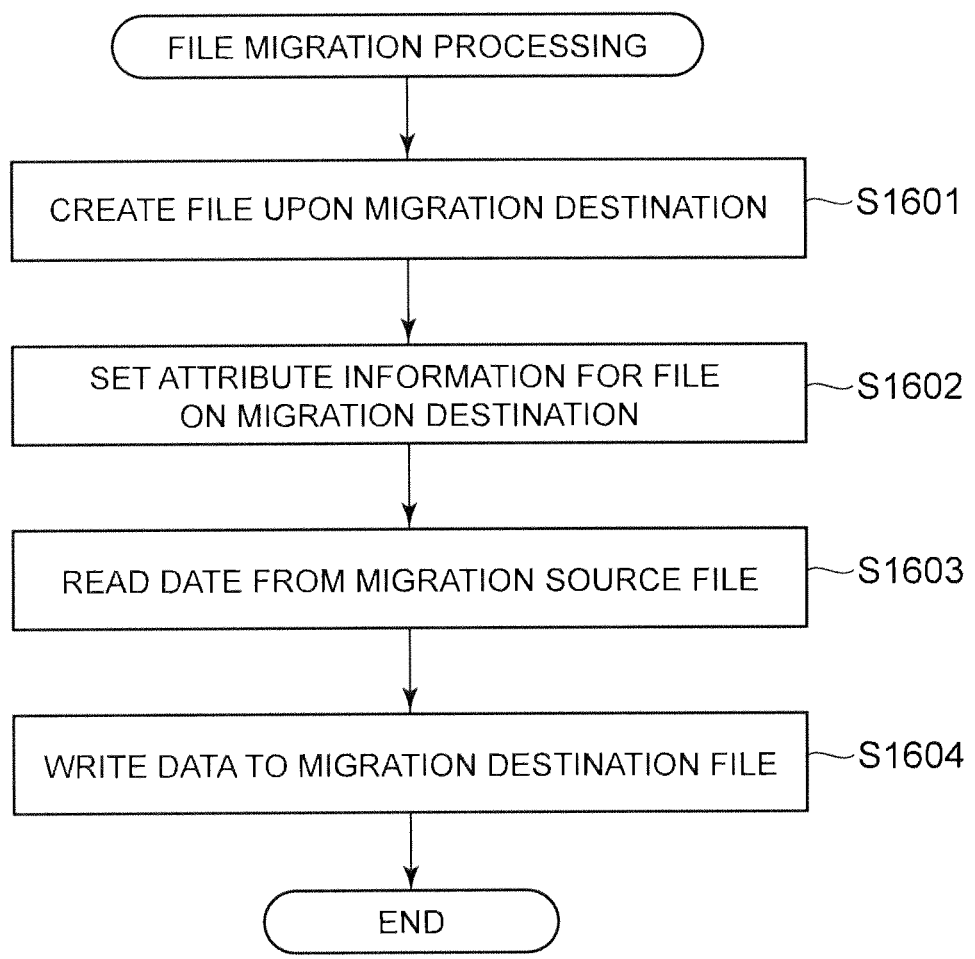
FIG. 16 is a figure showing an example of file migration processing, in this first embodiment.

FIG. 16 is an example of processing flow, showing the operation of the file migration processing. This file migration processing is a portion of the processing performed by the data migration processing program 800.

First, the data migration program 800 issues a file creation request from the file request transmission module 810 to the migration destination file server 300, and creates a file in a temporary state upon the migration destination file server 300 (a step S1601). If the file server program 900 is, for example, NFS, then this creation request corresponds to the procedure "create". It should be understood that this creation processing for a file in a temporary state upon the migration destination file server 300 at this time will be described hereinafter.

Next, the data migration program 800 issues an attribute information setting request from the file request transmission module 810 to the migration destination file server 300, and sets the file which has been created upon the migration destination file server to possess the attribute information of the migration subject file (a step S1602). If the file server program 900 is, for example, NFS, then this setting request corresponds to the procedure "settatr". It should be understood that this attribute information setting processing upon the migration destination file server 300 at this time will be described hereinafter.

Next, the data migration program 800 issues a data read request from the file request transmission module 810 to the migration source file server 200, and reads in the migration subject file (a step S1603). If the file server program 900 is, for example, NFS, then this read request corresponds to the procedure "read". And next, the data migration program 800 issues a data write request from the file request transmission module 810 to the migration destination file server 300, and writes the data of the migration subject file (a step S1604). If the file server program 900 is, for example, NFS, then this write request corresponds to the procedure "write". This data write processing upon the migration destination file server 300 will be described hereinafter.

Figure 17:
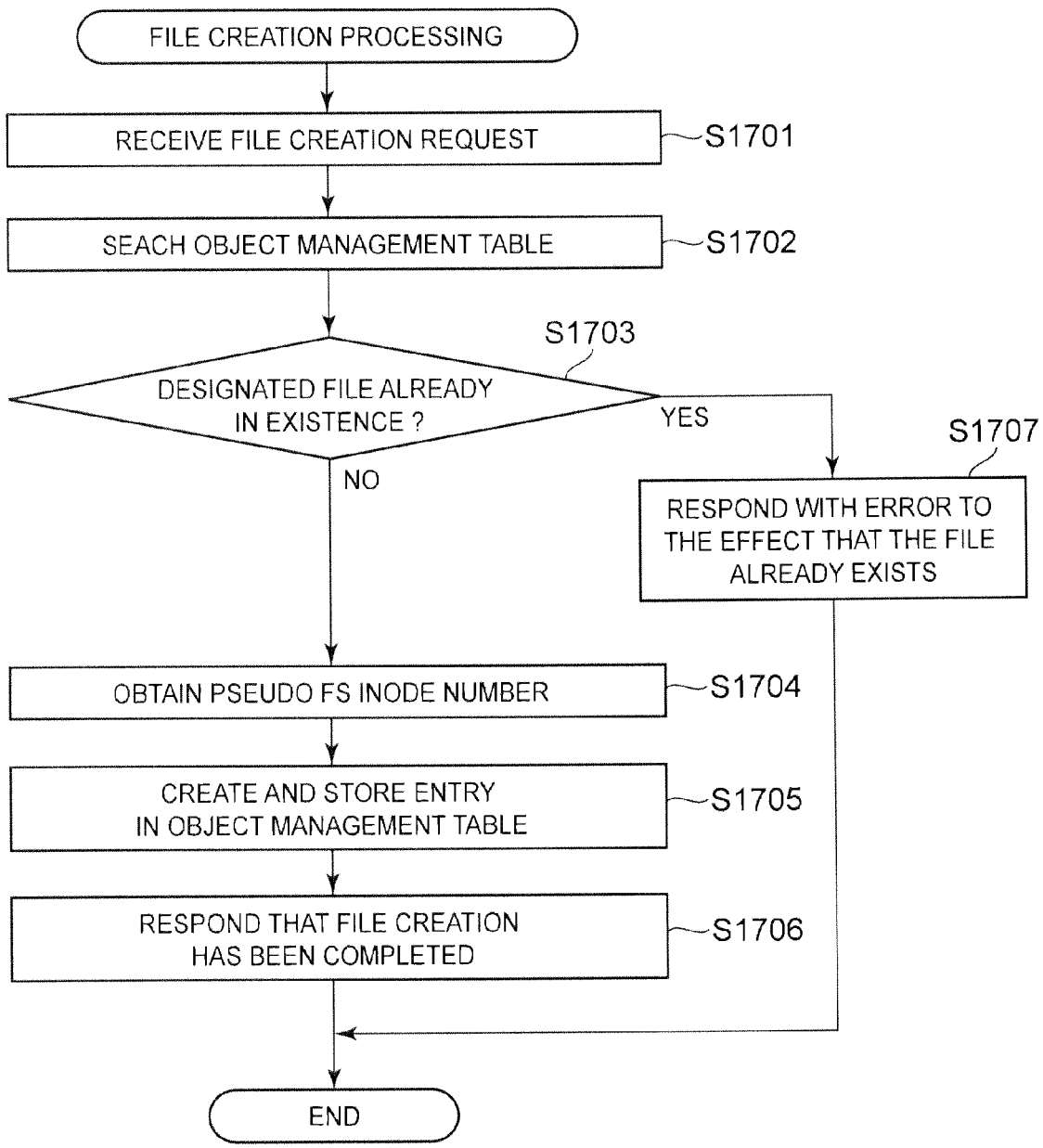
FIG. 17 is a figure showing an example of processing by a file creation module, in this first embodiment.

FIG. 17 is an example of processing flow, showing the operation of the file creation module 710. This file creation module 710 is executed when the file server program 900 has received a file creation request. The name of the file to be created is included in this file creation request. Here, the file which the file creation module 710 creates is actually a file in a temporary state upon the pseudo file system. The fact that this is a file in a temporary state is hidden from the point of view of the client computer 100 and the data migration device 400, and thus they deal with it like a normal file.

First, the file creation module 710 receives a file creation request from the file server program 900 (a step S1701).

Next, the file creation module 710 searches the object management table 1200 (a step S1702), and determines whether or not the file which has been designated already exists upon the migration destination file server 300 (a step S1703).

If the file that has been designated already is in existence (YES in the step S1703), then the file creation module 710 sends an error response to the file server program 900 to the effect that this designated file already exists (a step S1707), and then processing terminates.

If the designated file does not yet exist (NO in the step S1703), then the file creation module 710 obtains a pseudo FS inode number used in the pseudo file system 660 (a step S1704).

And the file creation module 710 creates one entry in the object management table 1200, and stores in that entry the file name of the designated file (the object name 1210) and the pseudo FS inode number 1220 which was obtained in the step S1704 (a step S1705).

Finally, the file creation module 710 responds to the file server program 900 that the file creation has been completed (a step S1706), and then this processing terminates.

Figure 18:
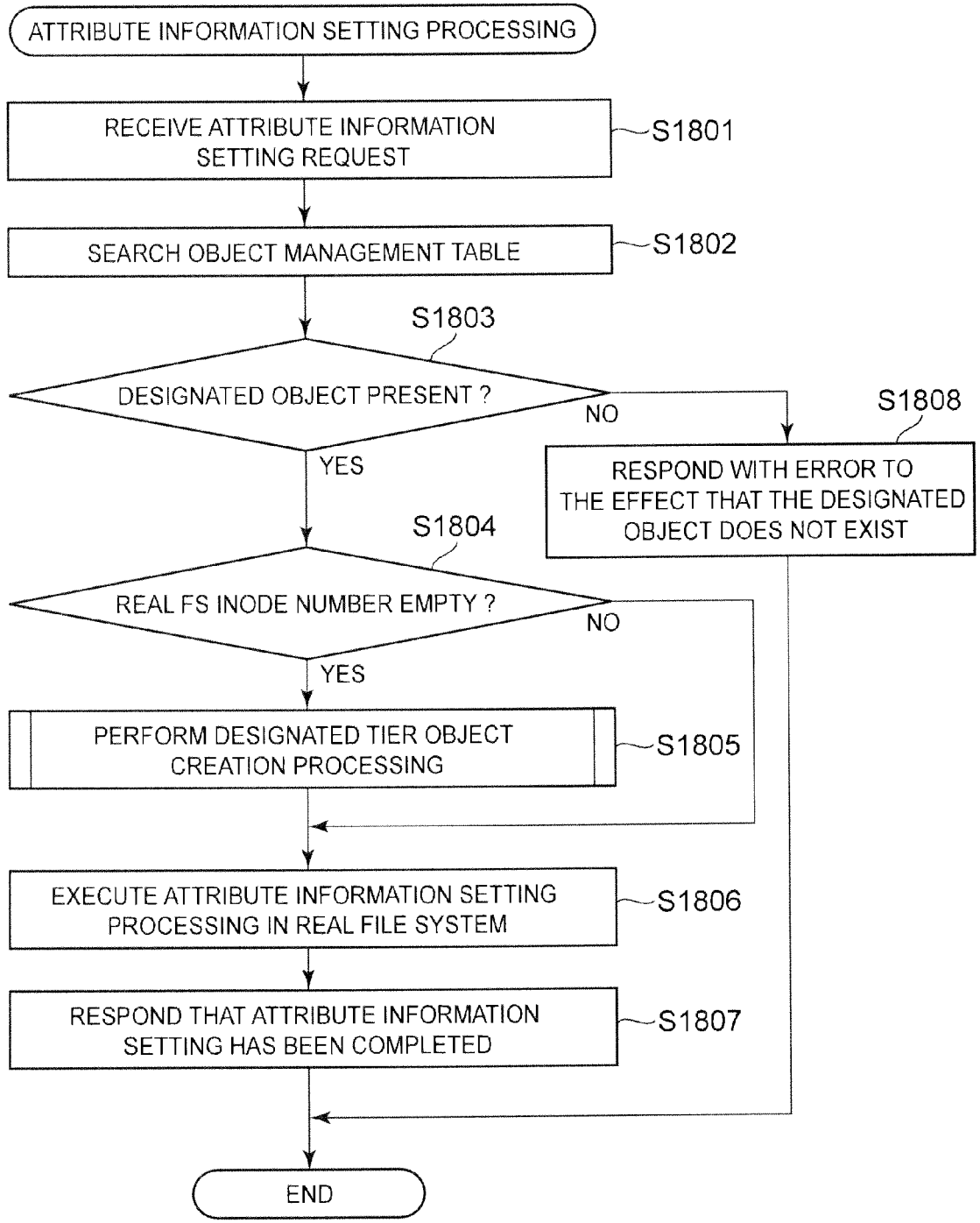
FIG. 18 is a figure showing an example of processing by an attribute information setting module, in this first embodiment.

While, in FIG. 17, a processing flow is explained which shows the operation of the file creation module 710, the same processing flow is also valid for the directory creation module 720 as well, with the variation that, if the directory which has been designated in the step S1603 already exists, then an error response to the effect that this designated directory already exists is sent to the file server program 900. FIG. 18 is an example of processing flow, showing the operation of the attribute information setting module 730. This attribute information setting module 730 is executed when the file server program 900 has received an attribute information setting request. In this attribute information setting request there are included, at least, the pseudo FS inode number 1220 which shows for which object attribute setting is to be performed, and attribute information. This attribute information may be, for example, the file creation time, the last update time, the access time, the file size, or the like.

First, the attribute information setting module 730 receives an attribute information setting request from the file server program 900 (a step S1801).

Next, the attribute information setting module 703 searches the object management table 1200 using the pseudo FS inode number 1220 (a step S1802), and determines whether or not the object which has been designated is present upon the migration destination file server 300 (a step S1803).

If the designated object is not present (NO in the step S1803), then the attribute information setting module 703 sends an error response to the file server program 900 to the effect that this object which has been designated is not present (a step S1808), and then processing terminates.

But if the designated object is present (YES in the step S1803), then the attribute information setting module 703 determines whether or not the real FS inode number 1240 is empty (for example, has the value NULL) (a step S1804).

If the real FS inode number 1240 is empty (YES in the step S1804), then the attribute information setting module 703 executes designated tier object creation processing (a step S1805), and creates a file or a directory in the real file system upon the appropriate tier. This designated tier object creation processing will be explained in detail hereinafter with reference to FIG. 19.

Next, the attribute information setting module 703 refers to the object management table 1200, and specifies the real FS inode number 1240 in the real file system of the object for which the attribute information is to be set. And the attribute information setting module 703 calls a subroutine for attribute information setting processing in the real file system, and executes attribute information setting for the object on the basis of this real FS inode number 1240 which has been specified (a step S1806).

Finally, the attribute information setting module 703 sends a response to the file server program 900 to the effect that the setting of attribute information has been completed (a step S1807), and then processing terminates.

If the real FS inode number 1240 is not empty (NO in the step S1804), then, since the file or directory has already been created in the real file system, the attribute information setting module 703 skips the designated tier object creation processing, and only calls the subroutine for attribute information setting processing in the real file system (in the step S1806).

Figure 19:
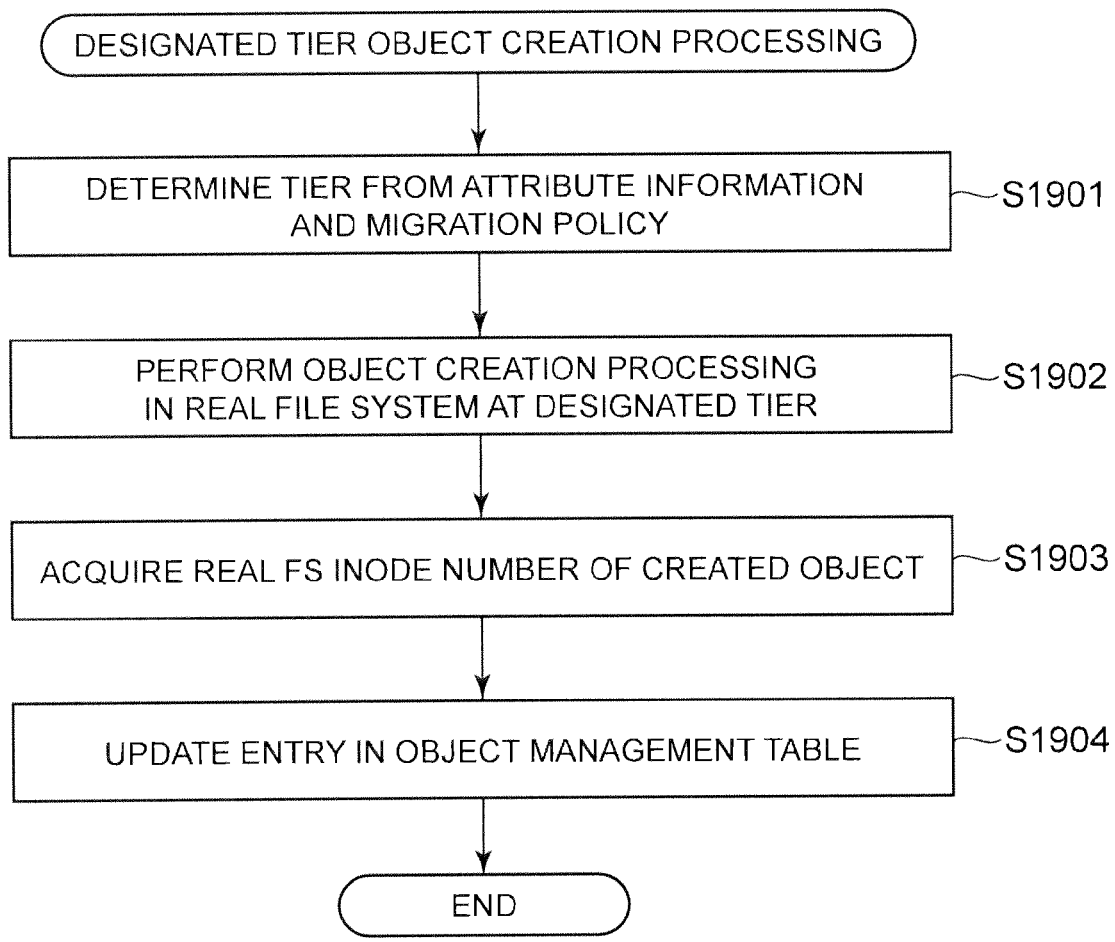
FIG. 19 is a figure showing an example of designated tier object creation processing, in this first embodiment.

FIG. 19 is an example of processing flow, showing the operation of the designated tier object creation processing. This designated tier object creation processing is a portion of the processing performed by the attribute information setting processing module 730.

First the attribute information setting module 730 determines, from the attribute information and the migration policy 700, upon which tier of the real file system the file or directory is to be created (a step S1901).

If no migration policy 700 is set, then it is determined from the tier movement policy 770 upon which tier of the real file system the file or directory is to be created. And, if both a migration policy 700 and a tier movement policy 700 are set, then it will be acceptable to arrange to utilize a combination of them. For example, it will be acceptable to apply the migration movement policy 700 after having applied the tier movement policy 770 as a priority; or it would also be acceptable to arrange to determine their priorities in the reverse order. The manager specifies which policy is to be prioritized during execution of migrations. When the tier has been determined, the attribute information setting module 730 saves the FSID 1230 of this tier of the real file system.

Next, the attribute information setting module 730 calls a subroutine for performing object creation processing in the real file system at this determined tier, and thus performs this object creation processing (a step S1902). If the designated object is a file, then file creation processing is executed; while, if the designated object is a directory, then directory creation processing is executed.

Next, the attribute information setting module 730 acquires the real FS inode number 1240 of the object which has been created (a step S1903).

And, when the object creation processing has been executed, the attribute information setting module 730 updates the entry in the object management table 1200, using the FSID 1230 of the real file system at the tier which was determined in the step S1901 and the real FS inode number which was acquired in the step S1903 (a step S1904).

Figure 20:
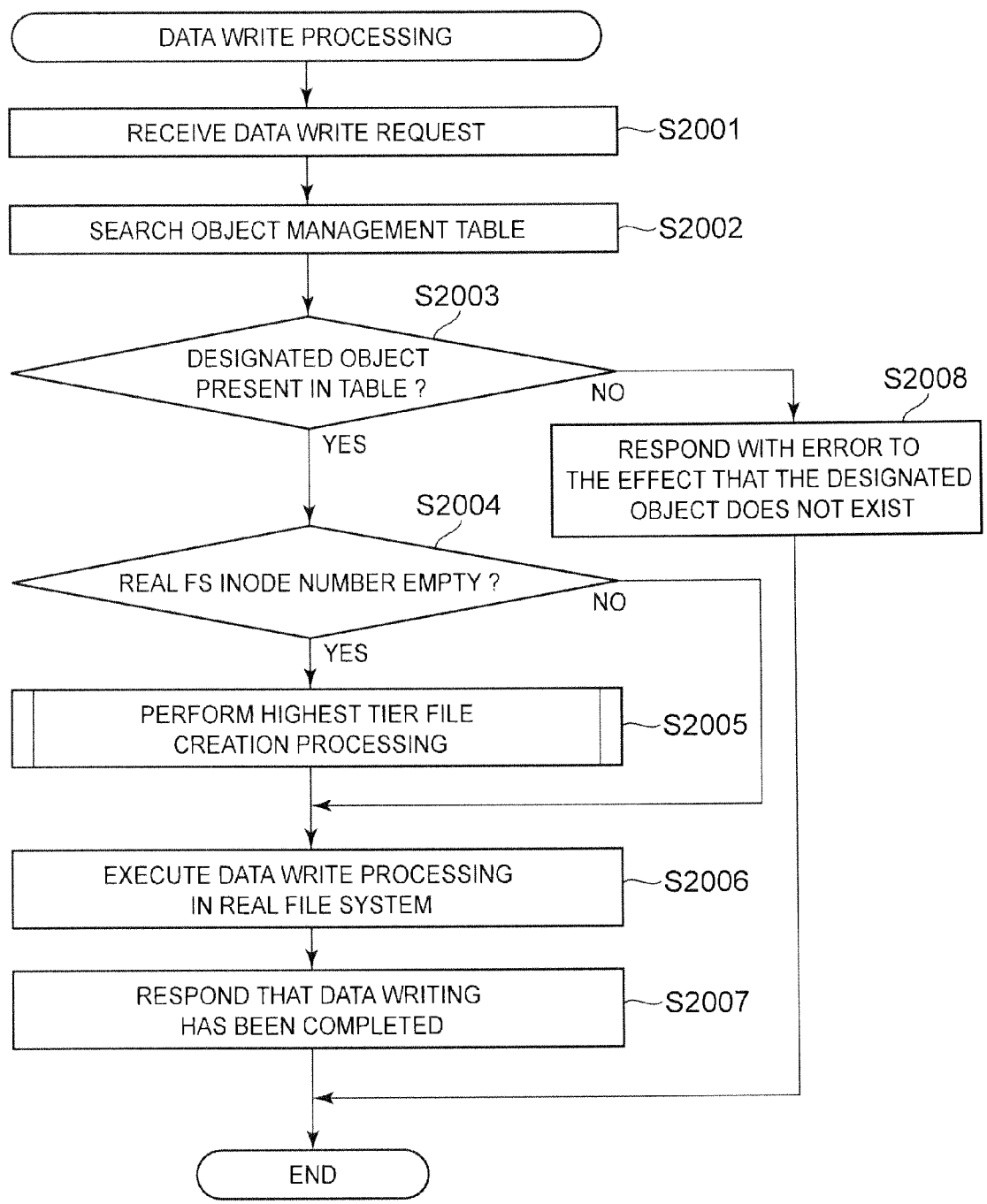
FIG. 20 is a figure showing an example of processing by a data write module, in this first embodiment.

FIG. 20 is an example of processing flow, showing the operation of the data write module 735. This data write module 735 is executed when the file server program 900 has received a data write request.

First, the data write module 735 receives a data write request from the file server program 900 (a step S2001).

Next, the data write module 735 searches the object management table 1200 using the pseudo FS inode number 1220 (a step S2002), and determines whether or not the designated object is present therein (a step S2003).

If the object which has been designated is not present (NO in the step S2003), then the data write module 735 sends an error response to the file server program 900 to the effect that this object which has been designated is not present (a step S2008), and then processing terminates.

But if the object which has been designated does exist (YES in the step S2003), then the data write module 735 checks whether or not the real FS inode number 1240 is empty (a step S2004).

If the real FS inode number 1240 is empty (YES in the step S2004), then the data write module 735 executes highest tier creation processing (a step S2005), and creates a file in the real file system at the highest tier. This highest tier creation processing is almost the same as the designated tier object creation processing explained above with reference to FIG. 19. The only point of difference is that the file is created at the highest tier, irrespective of the attribute information and the migration policy.

And the data write module 735 calls a subroutine for performing the data write processing in the real file system, and thereby executes this data writing (a step S2006).

Finally, the data write module 735 sends a response to the file server program 900 to the effect that the data writing has been completed (a step S2007), and then processing terminates.

If the real FS inode number 1240 is not empty (NO in the step S2004), then, since the file has already been created in the real file system, the data write module 735 skips the highest tier file creation processing, and only calls the subroutine for data write processing in the real file system (in the step S2006).

The above completes the explanation of this first embodiment of the present invention. It should be understood that while, in this first embodiment, an example is shown in which the data migration program 800 and the migration management program 440 are programs which run upon the data migration device 400, it would also be acceptable for them to be programs which run upon the migration destination file server 300.

Moreover, in this embodiment, an example has been shown in which, in order to migrate the file to an appropriate tier according to the migration policy, at the stage that the file creation module 710 operates, the file is only created upon the pseudo file system 660, while, at the stage that the attribute information setting module 730 operates, the file is created upon the real file system. However, it would also be acceptable for the file creation module 710 to create the file upon the pseudo file system 660 and upon the real file system of the highest tier, and for the attribute information setting module 730 to decide whether or not this file matches the migration policy, and to perform processing to move the tier of the file, only if it matches.

Since, according to this embodiment, it is possible to perform data migration according to a data read request or an attribute information setting request which is supplied by the file server program 900, accordingly it becomes possible to perform migration efficiently, even from a standard file server which is not endowed with any HSM function.

Moreover, in this embodiment, by specifying in advance the tier at which a file which is to be the subject of reading is stored, it is possible to read out this file which is to be the subject of reading directly from the second tier, without storing the file upon the first tier.

With HSM according to the prior art, when access is made to a file which has been stored at the second tier, the read request is answered after having moved this file from the second tier to the first tier. Due to this, an influence is exerted upon the performance when the number of file movements from the second tier to the first tier increases greatly.

However, in this embodiment, by reading out the file from the second tier according to the method below, it is possible to respond to read requests from the client computer in an efficient manner without any influence being exerted upon the performance due to moving of files between the tiers.

When the migration destination file server 300 receives a file handle acquisition request from the client computer 100, it transmits the file handle of the file which is the subject to the client computer 100. If the file server program 900 is, for example, NFS, then this lock acquisition request corresponds to the procedure "lookup" request. This file handle is an identifier for the file, and includes the inode number. In this embodiment, the migration destination file server 300 transmits to the client computer 100 a file handle which has been generated from the pseudo FS inode number.

Next, when a read request for this file handle has arrived from the client computer 100, the migration destination file server 300 searches the object management table 1200 while taking the inode number which is included in this file handle as a key. And the server 300 acquires the real FSID 1120 which corresponds to this file handle, specifies the real file system upon which the file which is to be the subject of access is stored, and acquires the real FS inode number 1240 of the file. And then a response to the the read request is made by reading data from the file on the real file system which has thus been specified.

Due to this it becomes possible, if the file which is to be the subject of being read has been stored upon the second tier, to respond to the read request without moving the file to the first tier.

Embodiment 2

Next, a second embodiment of the present invention will be explained. The following discussion focuses principally upon explanation of the points in which this second embodiment differs from the first embodiment, and detailed description features which are in common with the first embodiment will be omitted or curtailed. First, the general flow of restore processing in this second embodiment will be explained.

(1) A manager sets a restore policy as a combination of attribute information which can be stored as standard when backing up the data upon a file system, such as file creation time, last file update time, last file access time, file size, and so on, and executes a restore operation.

(2) A restore control device issues a restore start request to a restore destination file server.

(3) The restore destination file server issues a restore data request to a media server, and receives restore data from the media server.

(4) The restore destination file server analyzes the file header which is included in this restore data, and acquires attribute information of a file.

(5) The restore destination file server issues a file creation request, and creates a file in a temporary state upon a pseudo file system.

(6) The restore destination file server determines a destination tier for file storage (a volume) on the basis of the attribute information acquired by (4) and the restore policy which was set by (2).

(7) The restore destination file server designates the tier which was determined by (6) and creates the file upon the real file system of the restore destination file server, and sets the attribute information which was acquired by (4).

(8) The restore destination file server issues a data write request, and writes the data in the file on the restore destination file server which was created by (7).

Figure 21:
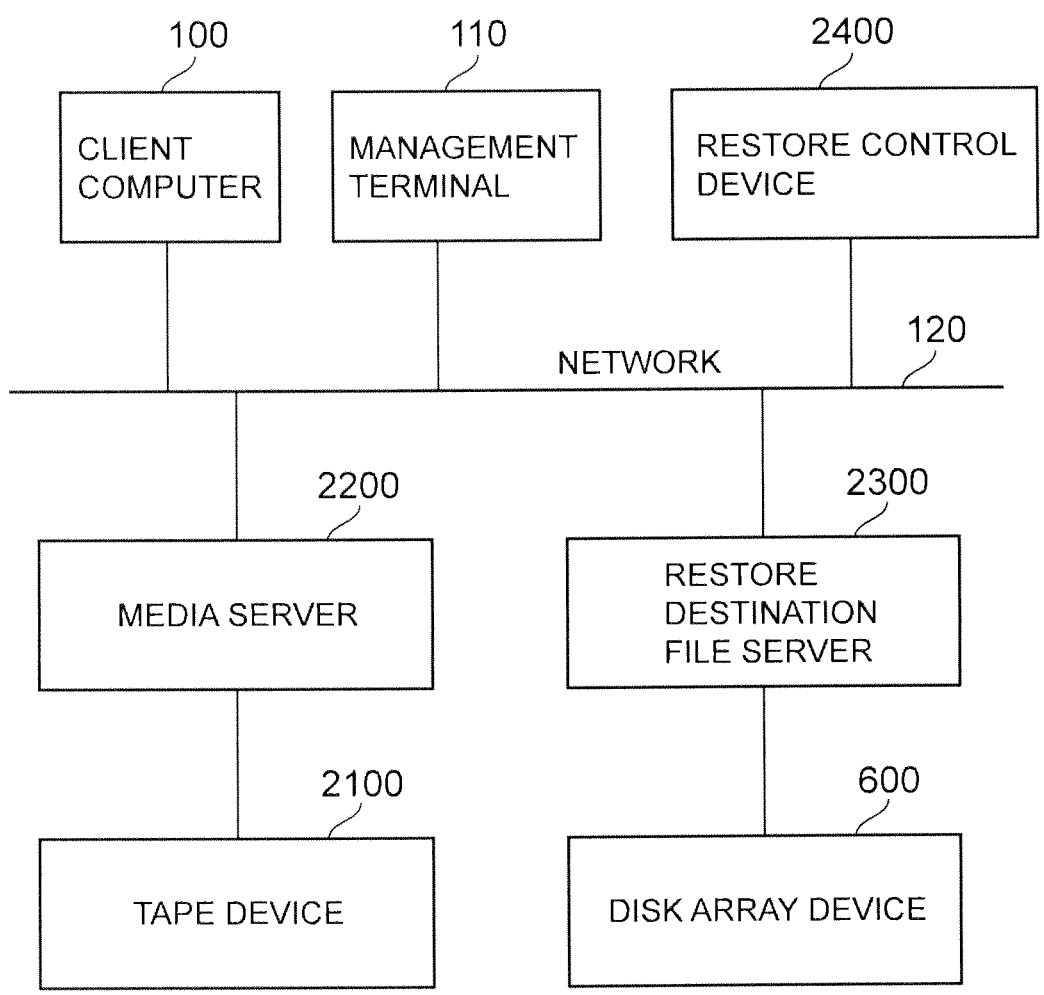
FIG. 21 is a figure showing an example of the structure of a file sharing system, in a second embodiment.

This second embodiment of the present invention will now be described in detail. FIG. 21 is a block diagram showing an example of the structure of the file sharing system according to this second embodiment. In addition to the client computer 100, the management terminal 110, the disk array device 600, and the network 120 of the first embodiment, this file sharing system according to the second embodiment also comprises a media server 2200, a tape device 2110, a restore destination file server 2300, and a restore control device 2400.

The client computer 100 is a computer which is used by a user who employs a file sharing service provided by the restore destination file server 2300.

The management terminal 110 is a computer which manages the restore control device 2400, and is used by a manager who manages the media server 2200, the restore destination file server 2300, and the restore control device 2400.

By controlling the tape device 2110, the media server 2200 backs up data upon the file server to tape, and, conversely, restores data upon tape to a file server.

The tape device 2110 is a storage device which stores data read and written via the media server 2200 by the restore destination file server 2300 or some other file server.

The restore destination file server 2300 is a computer which supplies a file sharing service to the client computer 100. Additionally, this restore destination file server 2300 is endowed with an HSM function, similarly to the migration destination file server 300 of the first embodiment described above. Moreover, the restore destination file server 2300 is a file server which serves as a restore destination when data is being restored from tape via the media server 2200.

The restore control device 2400 is a computer which restores data from tape via the media server 2200, while sending commands to the media server 2200 and the restore destination file server 2300.

It should be understood that communication related to restore and restore control between the restore control device 2400 and the media server 2200, between the restore control device 2400 and the restore destination file server 2300, and between the media server 2200 and the restore destination file server 2300, is performed on the basis of some standard protocol, such as, for example, NDMP (Network Data Management Protocol) or the like.

Figure 22:
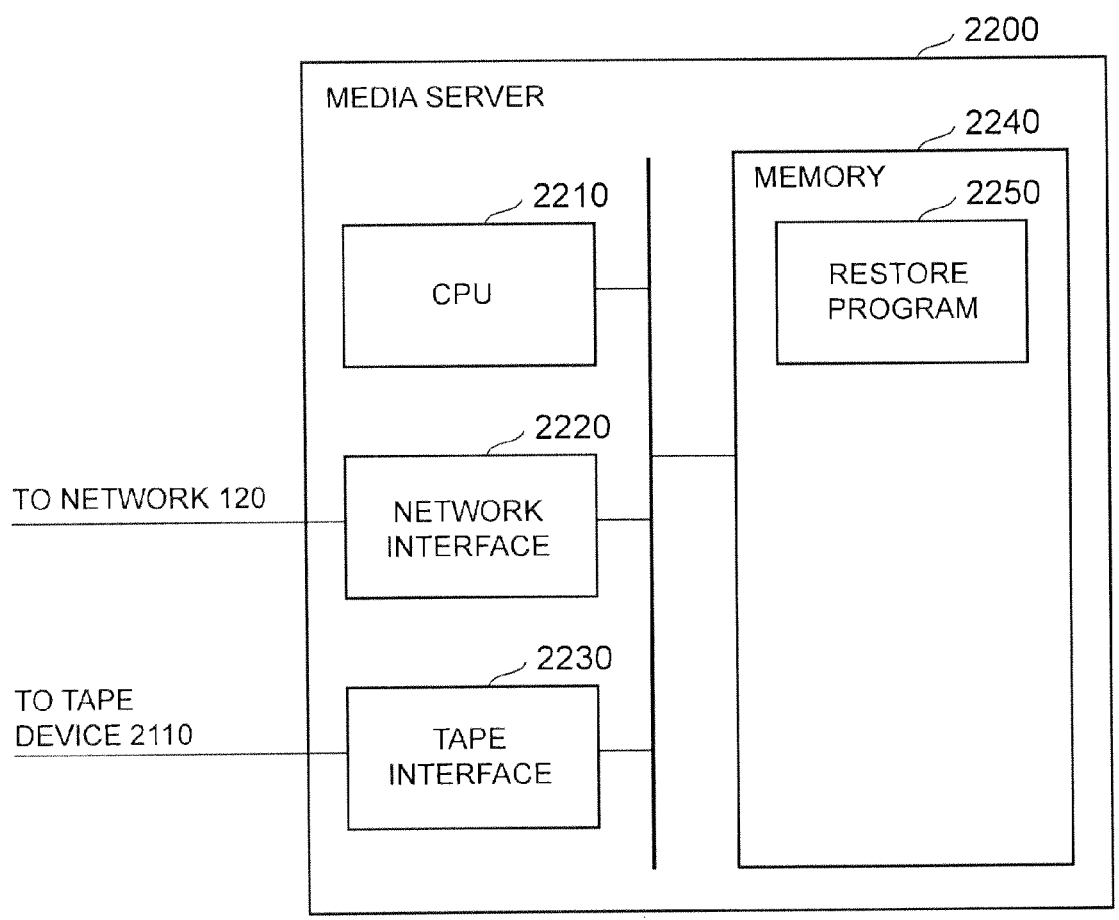
FIG. 22 is a figure showing the internal structure of a media server, in this second embodiment.

FIG. 22 is a block diagram showing the structure of the media server 2200. The media server 2200 is a computer which comprises a CPU 2210, a network interface 2220, a tape interface 2230, a memory 2240, and an internal communication path which connects those elements internally (such as, for example, a bus).

The CPU 2210 executes a program which is stored in the memory 2240. The network interface 2220 is used for communication with the restore destination file server 2300 and the restore control device 2400. The tape interface 2230 is used for communication with the tape device 2210. Programs and data are stored in the memory 2240. For example, a restore program 2250 and so on is stored. Moreover, a backup program or the like for backing up data to tape is also stored in the memory 2240, although this feature is not shown in FIG. 22.

The restore program 2250 is a program which receives commands from the restore control device 2400, and performs restoration in collaboration with the restore destination file server 2300.

Figure 23:
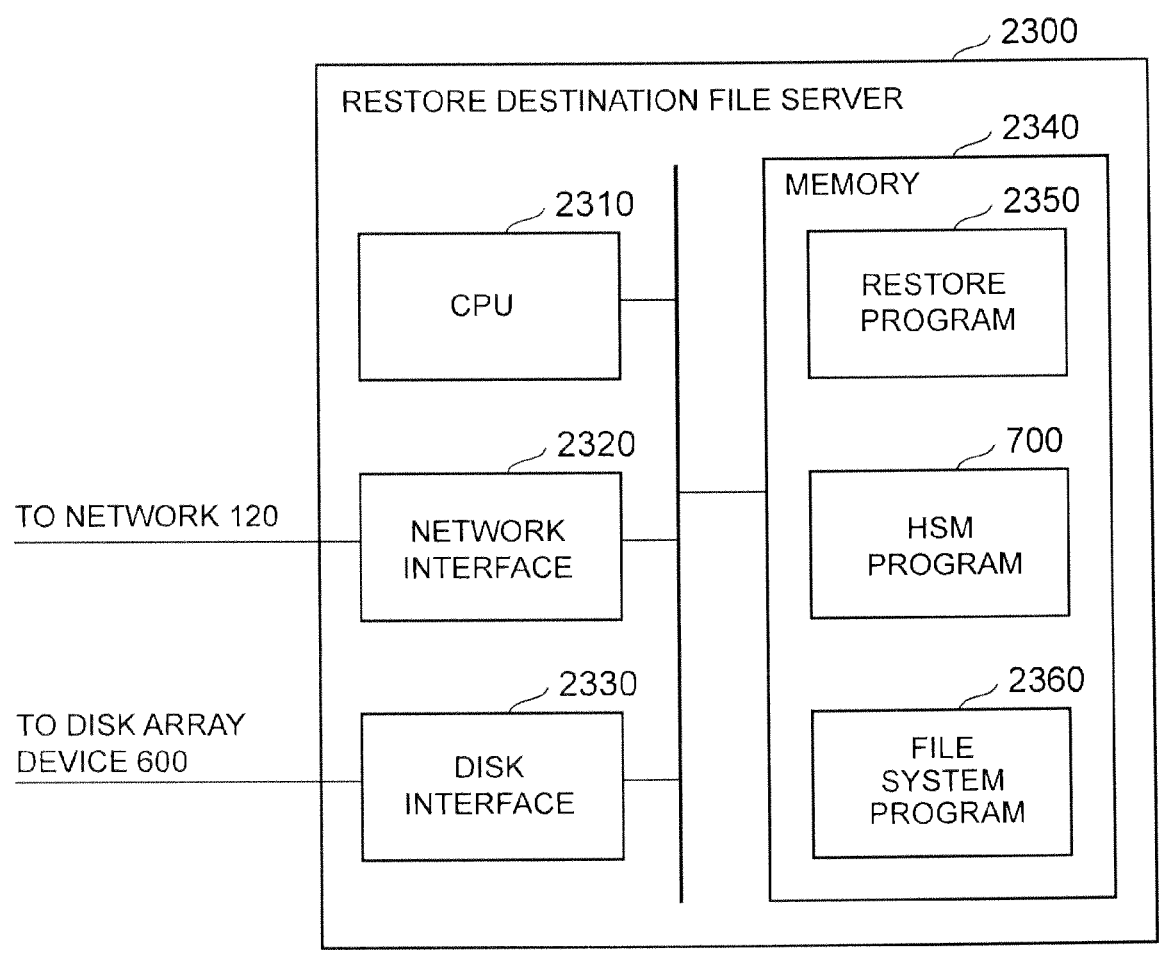
FIG. 23 is a figure showing the internal structure of a restore destination file server, in this second embodiment.

FIG. 23 is a block diagram showing the structure of the restore destination file server 2300.

The restore destination file server 2300 is a computer which comprises a CPU 2310, a network interface 2320, a disk interface 2330, a memory 2340, and an internal communication path which connects those elements internally (such as, for example, a bus).

The CPU 2310 executes a program which is stored in the memory 2340. The network interface 2320 is used for communication with the client computer 100, the media server 2200, and the restore control device 2400. The disk interface 2330 is used for communication with the disk array device 600. Programs and data are stored in the memory 2340. For example, a restore program 2350, a HSM program 700, a file system program 2360 and so on are stored. Moreover, a file server program or the like for supplying a file sharing service to the client computer 100 is also stored in the memory 2240, although this feature is not shown in FIG. 23.

The HSM program 700 of this second embodiment is fundamentally the same as the HSM program 700 of the first embodiment described above, except that the migration policy 760 is used for storing a restore policy which the manager has designated for when restore is to be performed. This restore policy could be the same as the data migration policy or the tier movement policy.

Furthermore, it would also be acceptable for the restore program 2350 to be held in the memory 340 of the migration destination file server 300 of the first embodiment described above.

Figure 24:
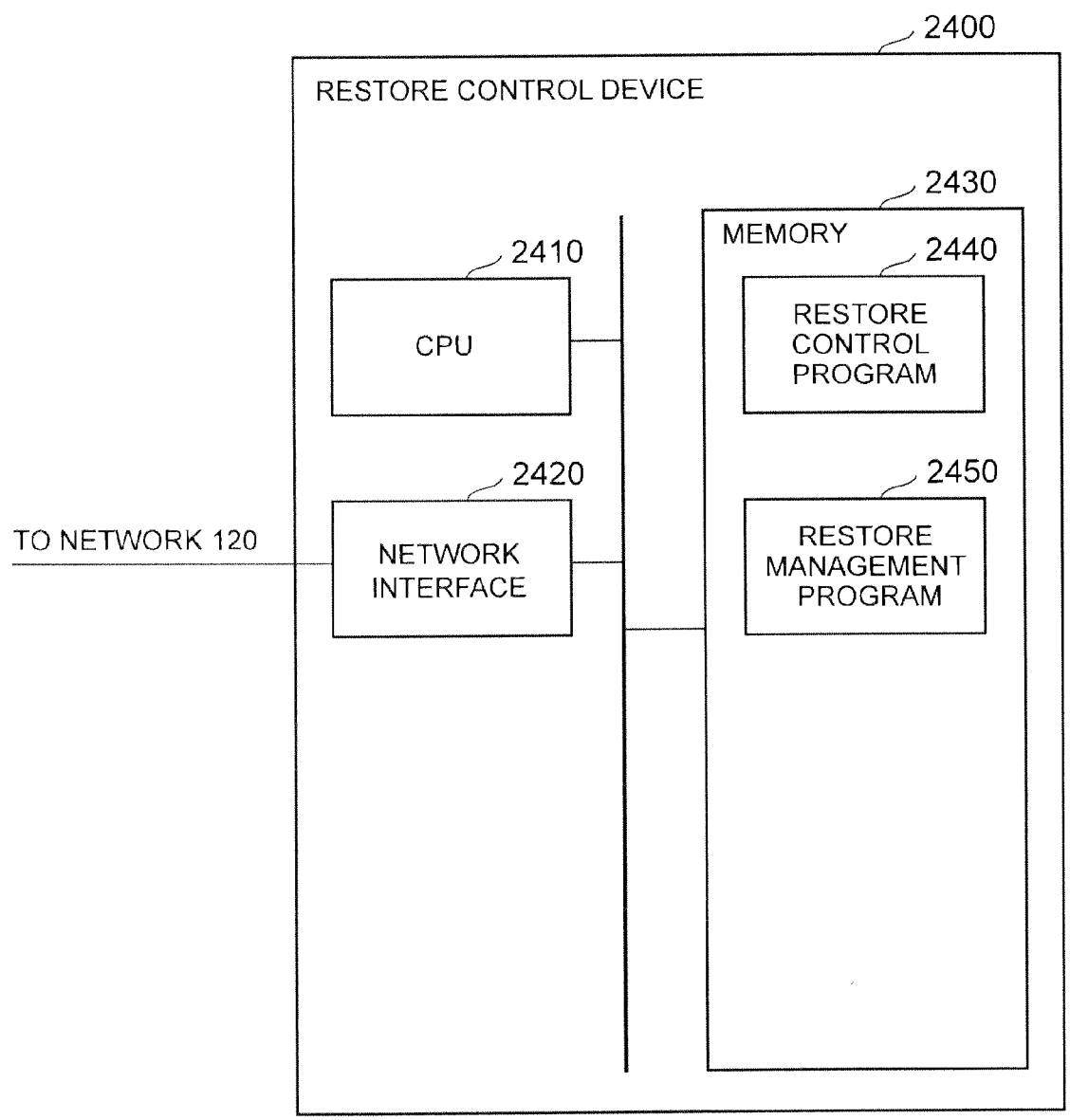
FIG. 24 is a figure showing the internal structure of a restore control device, in this second embodiment.

FIG. 24 is a block diagram showing the structure of the restore control device 2400. The restore control device 2400 is a computer which comprises a CPU 2410 which executes a program stored in a memory 2430, a network interface 2420 which is used for communication with the management terminal 110, the media server 2200, and the restore destination file server 2300, and the memory 2430 which stores programs and data, and these elements are internally coupled together by a communication path (such as, for example, a bus).

Programs and data are stored in the memory 2430 of the restore control device 2400. For example, a restore control program 2440, a restore management program 2450 and so on may be stored.

The restore control program 2440 is a program which, performs control when restoring data upon tape to the restore destination file server 230 via the media server 2200, by outputting commands to the media server 2200 and the restore destination file server 2300.

The restore management program 2450 is a program which supplies to the management terminal 110 an interface which enables the manager to specify information which is needed for performing restoration (for example a restore policy and restore data), and an interface for taking as input the information which has been specified by the manager and for executing the restore control program 2440. Here by an interface is meant, for example, a screen for the manager to perform operation (typically, a GUI (Graphical User Interface).

Moreover, it would also be acceptable for the restore control device 2400 to be the same as the data migration device 400 of the first embodiment described above. In this case the restore control program 2430 and the restore management program 2450 would be stored in the memory 430 of the data migration device 400.

Figure 25:
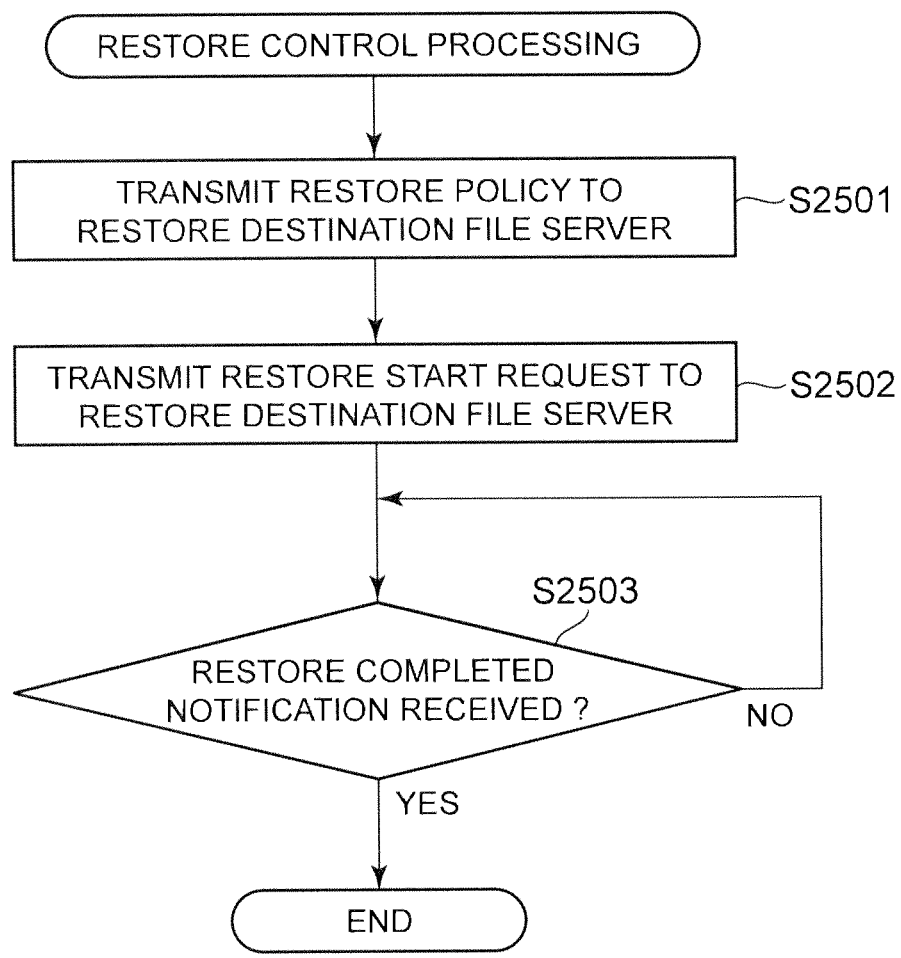
FIG. 25 is a figure showing an example of a restore control program, in this second embodiment.

In the following, the processing flow when the system of this second embodiment is performing restore processing will be explained with reference to FIGS. 25 and 26. FIG. 25 is an example of processing flow, showing the operation of the restore control program 2440. This restore control program 2440 may, for example, be executed when a restore execution command has been received from the management terminal 110. This restore execution command includes information related to the restore policy which has been set by the manager and restore data (for example, which file system is to be restored, and so on). It should be understood that it would also be acceptable for the manager not to set the restore policy, and in this case, restoration would be performed according to the tier movement policy 770. Moreover, it should be understood that the manager is enabled to perform execution of restoration, setting of the restore policy, and settings related to the priority levels of the restore policy and the tier movement policy 770, using a screen like, for example, the migration execution screen 1300 or the migration policy setting screen 1400.

First, the restore control program 2440 issues a restore policy setting request to the restore destination file server 2300 (a step S2501). Due to this, the restore policy which has been set by the manager is set within the HSM program 700. If the manager has commanded that restoration should be performed according only to the tier movement policy of the restore destination file server 2300, or if no restore policy has been set, then nothing is set.

Next, the restore control program 2440 issues a restore start request to the restore destination file server 2300 (a step S2502). Due to this, the restore destination file server 2300 starts to request data from the media server 2200, and starts the restore process.

Then, the restore control program 2440 waits for a restore completed notification, and terminates the restore control procedure when a restore completed notification has been received (YES in a step S2503). If no restore completed notification is received (NO in the step S2503), then the wait processing continues just as it is. It should be understood that, during this waiting processing, communication with the restore destination file server 2300 and the media server 2200 may also be continued in order to check upon the state of restore progress and in order to control the tape device.

Figure 26:
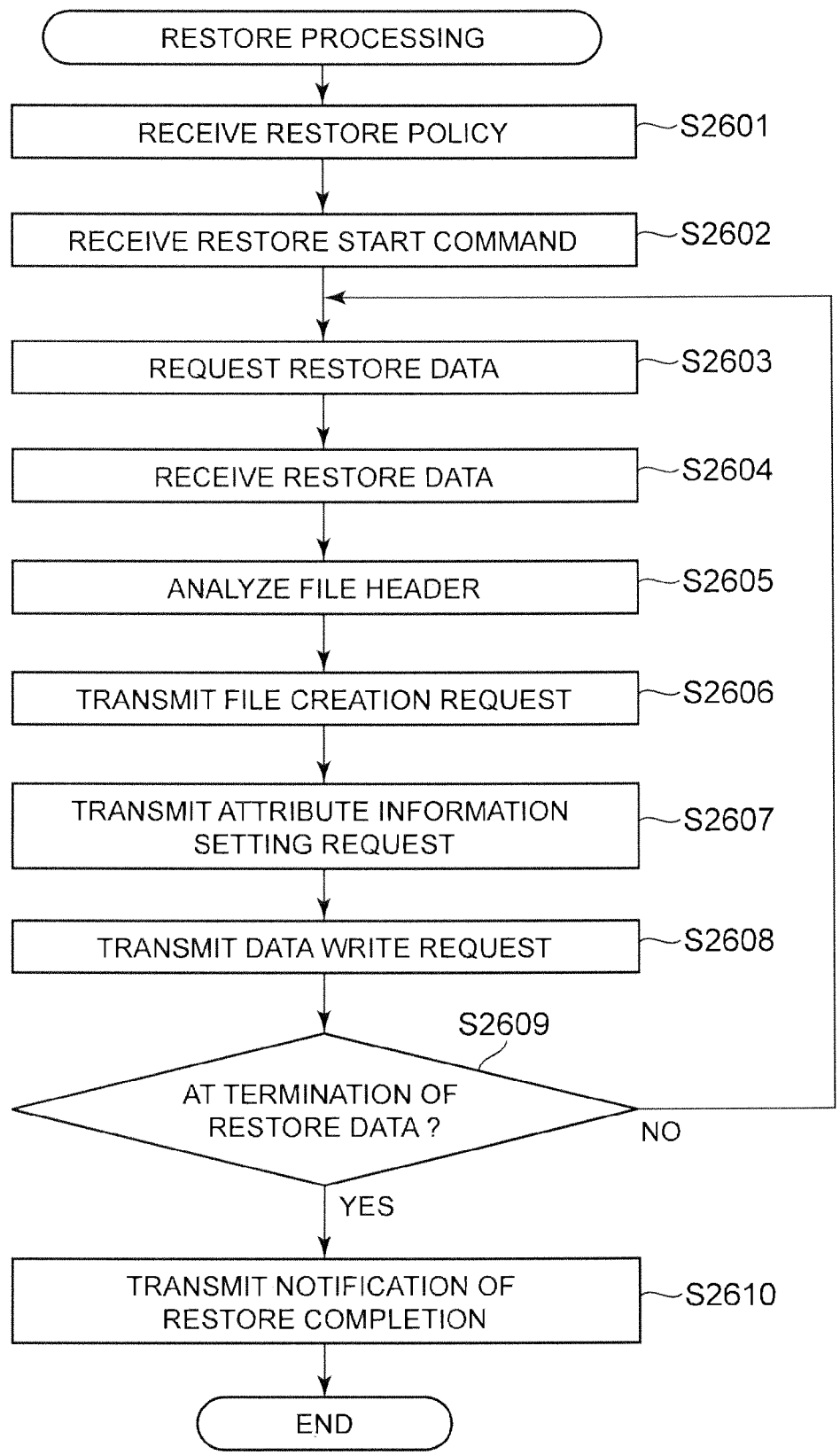
FIG. 26 is a figure showing an example of processing by this restore program, in this second embodiment.

FIG. 26 is an example of processing flow, showing the operation of the restore program 2350 of the restore destination file server 2300.

First, the restore program 2350 waits for transmission of a restore policy setting request from the restore control device 2400. When the restore program 2350 receives a restore policy setting request (a step S2601), it sets a restore policy within the HSM program 700.

Next, the restore program 2350 waits for transmission of a restore start request from the restore control device 2400. When the restore program 2350 receives a restore start request (a step S2602), it starts restoration as will now be explained.

Next, the restore program 2350 requests the restore data from the media server 2200 (a step S2603). The restore program 2250 of the media server 2200 responds to this request. When the restore program 2250 transmits restore data, the restore program 2350 receives this restore data (a step S2604). It should be understood that this restore data might be of fixed length, or might be of variable length. Moreover, this restore data might include a plurality of files. Even further, this restore data might be in compressed form.

Next, the restore program 2350 analyzes the file header of the restore data which was received in the step S2604, and acquires attribute information of that file, such as its path name, size, last update time, and so on (a step S2605).

Next, the restore program 2350 transmits a file creation request to the HSM program 700, in which the path name of the file acquired in the step S2605 is specified (a step S2606). Due to this the file creation module 710, in other words the file creation processing explained with reference to FIG. 17, is executed.

Next, the restore program 2350 transmits an attribute information setting request to the HSM program 700, in which the other attribute information which was acquired in the step S2605 is specified (a step S2607). Due to this the attribute setting module 730, in other words the attribute setting processing explained with reference to FIG. 18, is executed.

And the restore program 2350 transmits a file write request to the HSM program 700, and writes the file body of the restore data which was received in the step S2604, in other words the actual data (a step S2608). At this time, on the side of the HSM program, the file write module 735, in other words the file write processing explained with reference to FIG. 20, is executed.

If the restore data which was received in the step S2604 includes a plurality of files, then the restore program 2350 continues to read the restore data, and performs the steps S2605 through S2608 in relation to the next file. Moreover, if the restore data is compressed, then the restore program 2350 performs the steps S2605 through S2608 after having performed decompression processing in advance. It should be understood that, in connection with whether or not the restore data is compressed, information related to the presence or absence of compression may be stored in the restore control device in backup processing, and notified by the restore control device 2400; or such information related to compression may be stored in the header portion of the restore data, or the like.

When all of the processing upon the restore data which was received in the step S2604 has been completed, a decision is made as to whether or not this restore data is the termination of all of the data which is to be the subject of restoration (a step S2609), and if it indeed is the termination (YES in the step S2609), then a restore completed notification is transmitted to the restore control device 2400 (a step S2610). But, if it is not yet the termination (NO in the step S2609), then further restore data is requested from the media server 2200 for a second time (the step S2603). It should be understood that, in order to make this decision as to whether this restore data is the termination of all the data to be restored, a rule may be instituted that data which indicates this fact (for example 1024 bytes of binary zeros) should be added to the termination of the data to be restored.

Moreover it should be understood that while, in the restore processing shown in FIG. 26, the restoration of a file was explained, the operation is fundamentally the same when the data to be restored includes a directory. When analyzing the header in the step S2605, it can be understood from the attribute information that this object is a directory. In this case after having, in the step S2605, transmitted a directory creation request instead of a file creation request, then an attribute information setting request is transmitted. Then the data write processing of the step S2608 is skipped.

The above completes the explanation of this second embodiment. According to this second embodiment, it becomes possible to perform restoration from a file system upon a standard file server which is not endowed with any HSM function to a file server which has an HSM function, in an efficient manner.

According to this embodiment, during data migration from a migration source file server which is not endowed with any HSM function to a migration destination file server which is endowed with HSM, it is possible to keep down the volume capacity which is required upon the migration destination, and furthermore it is possible to prevent decrease of performance directly after the migration.

What is claimed is:
1. A data migration system, comprising:
a first file server that includes a processor;
a second file server that includes a processor;
a first storage device which is coupled to said first file server;
a second storage device which is coupled to said second file server; and
a third storage device which is coupled to said second file server;
wherein:

said first file server creates a first file system upon said first storage device;

said first file system has a first file;

said second file server creates a second file system upon said second storage device and a third file system upon said third storage device;

said first file server creates a tiered structure in which said second file system, and said third file system, are consolidated virtually;

when migrating data of said first file to said third file system, said second file server is configured to:

receive a file creation instruction;

create a second file in a temporary state in a pseudo file system, said second file being specified by a pseudo inode number;

receive attribute information of said first file;

when said second file is determined to be in the temporary state in the pseudo file system as determined by referring to an object management information, referring to said attribute information of said first file to assign attribute information to said second file;

determine which file system said first file is migrated to, said second file system or said third file system, when migration to said third file system is determined:

create a third file in said third file system, said third file being specified by a real inode number and being a real file in a real file system;

assign said third file with said attribute information of said first file as attribute information of said third file using said object management information, said object management information including a plurality of entries each assigning a pseudo inode number of a virtual file in a pseudo file system with a real inode number of said real file system;

receive said data of said first file; and store said data of said first file in said third file.

2. The data migration system according to claim 1, wherein:

said second file server has a migration policy and is configured to determine a migration destination of said first file, on the basis of said attribute information of said first file and said migration policy.

3. The data migration system according to claim 2, wherein:

said second file server has a tier movement policy based upon attribute information for, when moving an object having attribute information within the file systems of said second file server, determining the file system which is to be the destination of moving;

if priority levels are set for said tier movement policy and said migration policy, applies said tier movement policy and said migration policy according to said priority levels.

4. The data migration system according to claim 2, wherein:

attribute information of each file is size, creation time, last update time, and last access time of each file.

5. The data migration system according to claim 1, wherein said second storage device is a FC (Fiber Channel) disk drive, and said third storage device is a SATA (Serial ATA) disk drive.

6. The data migration system according to claim 1, wherein:

said second file server is further coupled to a media server, and said media server is coupled to a fourth storage device;

said second file server has a restore policy based upon said attribute information, for determining the file system of the restore destination for said file which is stored upon said fourth storage device;

said second file server, when migrating said file, is configured to acquire said file from said media server, and acquire attribute information from said file; and said second file server is configured to determine the file system of the restore destination for said file, and restore said file, on the basis of said attribute information which has been acquired and said restore policy.

7. A data migration method in a data migration system comprising:

a first file server that includes a processor;

a second file server that includes a processor;

a first storage device which is coupled to said first file server;

a second storage device which is coupled to said second file server; and a third storage device which is coupled to said second file server, the method comprising:

creating, by said first file server, a first file system upon said first storage device, said first file system having a first file;

creating, by said second file server, a second file system upon said second storage device and a third file system upon said third storage device;

creating, by said first file server, a tiered structure in which said second file system, and said third file system, are consolidated virtually;

when migrating data of said first file to said third file system, the method further comprising:

receiving, by said second file server, a file creation instruction;

creating, by said second file server, a second file in a temporary state in a pseudo file system, said second file being specified by a pseudo inode number;

receiving, by said second file server, attribute information of said first file;

when said second file is determined to be in the temporary state in the pseudo file system as determined by referring to an object management information, referring to said attribute information of said first file to assign attribute information to said second file;

determining which file system said first file is migrated to, said second file system or said third file system, when migration to said third file system is determined:

creating a third file in said third file system, said third file being specified by a real inode number and being a real file in a real file system;

assigning said third file with said attribute information of said first file as attribute information of said third file using said object management information, said object management information including a plurality of entries each assigning a pseudo inode number of a virtual file in a pseudo file system with a real inode number of said real file system;

receiving said data of said first file; and storing said data of said first file in said third file.

8. The data migration method according to claim 7, wherein:

said second file server has a migration policy, the method further comprising:

determining a migration destination of said first file, on the basis of said attribute information of said first file and said migration policy.

9. The data migration method according to claim 8, wherein said second file server has a tier movement policy based upon attribute information,
the method further comprising:
when moving an object having attribute information within the file systems of said second file server, determining the file system which is to be the destination of moving;
if priority levels are set for said tier movement policy and said migration policy, applies said tier movement policy and said migration policy according to said priority levels.

10. The data migration method according to claim 8, wherein:
attribute information of each file is size, creation time, last update time, and last access time of each file.

11. The data migration method according to claim 7, wherein said second storage device is a FC (Fiber Channel) disk drive, and said third storage device is a SATA (Serial ATA) disk drive.

12. The data migration method according to claim 7, wherein:
said second file server is further coupled to a media server, and said media server is coupled to a fourth storage device;
said second file server has a restore policy based upon said attribute information,
the method further comprising:
based on the restore policy, determining the file system of the restore destination for said file which is stored upon said fourth storage device;
acquiring, by said second file server when migrating said file, said file from said media server, and acquiring attribute information from said file; and
determining, by said second file server, the file system of the restore destination for said file; and
restoring said file on the basis of said attribute information which has been acquired and said restore policy.

* * * * *